(12) United States Patent
Viswanathan et al.

(10) Patent No.: US 10,200,683 B2
(45) Date of Patent: Feb. 5, 2019

(54) DEVICES AND METHODS FOR PROVIDING FOVEATED SCANNING LASER IMAGE PROJECTION WITH DEPTH MAPPING

(71) Applicant: Microvision, Inc., Redmond, WA (US)

(72) Inventors: P. Selvan Viswanathan, Bellevue, WA (US); Jari Honkanen, Monroe, WA (US); Douglas R. Wade, Edmonds, WA (US); Bin Xue, Mukilteo, WA (US)

(73) Assignee: Microvision, Inc., Redmond, WA (US)

( * ) Notice: Subject to any disclaimer, the term of this patent is extended or adjusted under 35 U.S.C. 154(b) by 273 days.

(21) Appl. No.: 15/386,576

(22) Filed: Dec. 21, 2016

(65) Prior Publication Data

US 2018/0176551 A1 Jun. 21, 2018

(51) Int. Cl.
| | |
|---|---|
| H04N 13/04 | (2006.01) |
| H04N 13/388 | (2018.01) |
| H04N 9/31 | (2006.01) |
| H04N 13/128 | (2018.01) |
| H04N 13/324 | (2018.01) |
| G01B 11/25 | (2006.01) |

(52) U.S. Cl.
CPC .......... *H04N 13/388* (2018.05); *G01B 11/25* (2013.01); *H04N 9/3161* (2013.01); *H04N 13/128* (2018.05); *H04N 13/324* (2018.05)

(58) Field of Classification Search
CPC ... H04N 13/271; H04N 13/363; H04N 9/3129
See application file for complete search history.

(56) References Cited

U.S. PATENT DOCUMENTS

| | | |
|---|---|---|
| 7,609,875 B2 | 10/2009 | Liu et al. |
| 8,446,571 B2 | 5/2013 | Fiess et al. |
| 9,098,931 B2 | 8/2015 | Shpunt et al. |
| 9,267,787 B2 | 2/2016 | Shpunt |
| 9,651,417 B2 | 5/2017 | Shpunt et al. |
| 9,677,878 B2 | 6/2017 | Shpunt et al. |

(Continued)

FOREIGN PATENT DOCUMENTS

WO    WO2016043704    3/2016

OTHER PUBLICATIONS

Microvision, Inc., , "Search Report and Written Opinion".

*Primary Examiner* — Tat C Chio
*Assistant Examiner* — Fabio S Lima
(74) *Attorney, Agent, or Firm* — Kevin D. Wills

(57) ABSTRACT

Devices and methods are described herein for providing foveated image projection. In general, at least one source of laser light is used to generate a laser beam, and scanning mirror(s) that reflect the laser beam into a pattern of scan lines. The source of light is controlled to selectively generate projected image pixels during a first portion of the pattern of scan lines, and to selectively generate depth mapping pulses during a second portion of the pattern of scan lines. The projected image pixels generate a projected image, while the depth mapping pulses are reflected from the surface, received, and used to generate a 3-dimensional point clouds that describe the measured surface depth at each point. Thus, during each scan of the pattern both a projected image and a surface depth map can be generated, with the surface depth map used to modify some portion of the projected pixels.

25 Claims, 18 Drawing Sheets

(56) References Cited

U.S. PATENT DOCUMENTS

| | | |
|---|---|---|
| 9,766,060 B1 | 9/2017 | Honkanen |
| 9,921,056 B2 | 3/2018 | Honkanen |
| 2010/0053591 A1* | 3/2010 | Gibson ............... H04N 9/3129 356/3.09 |
| 2010/0073748 A1 | 3/2010 | Holmes et al. |
| 2011/0279648 A1* | 11/2011 | Lutian .................... G01S 17/89 348/46 |
| 2013/0107000 A1 | 5/2013 | Xue et al. |
| 2013/0127854 A1 | 5/2013 | Spunt et al. |
| 2013/0207970 A1 | 8/2013 | Primesense |
| 2015/0192677 A1 | 7/2015 | Yu et al. |
| 2016/0134851 A1 | 5/2016 | Grundhofer |
| 2016/0195386 A1 | 7/2016 | Yoon et al. |
| 2017/0090032 A1 | 3/2017 | Ridderbusch |
| 2017/0090034 A1 | 3/2017 | Ridderbusch |
| 2017/0153319 A1 | 6/2017 | Villeneuve et al. |
| 2017/0176596 A1* | 6/2017 | Shpunt .................... G01S 17/89 |
| 2017/0205873 A1 | 7/2017 | Shpunt et al. |
| 2017/0244955 A1 | 8/2017 | Shpunt et al. |
| 2017/0277028 A1* | 9/2017 | Short .................... G03B 17/54 |
| 2018/0176551 A1 | 6/2018 | Viswanathan |

* cited by examiner

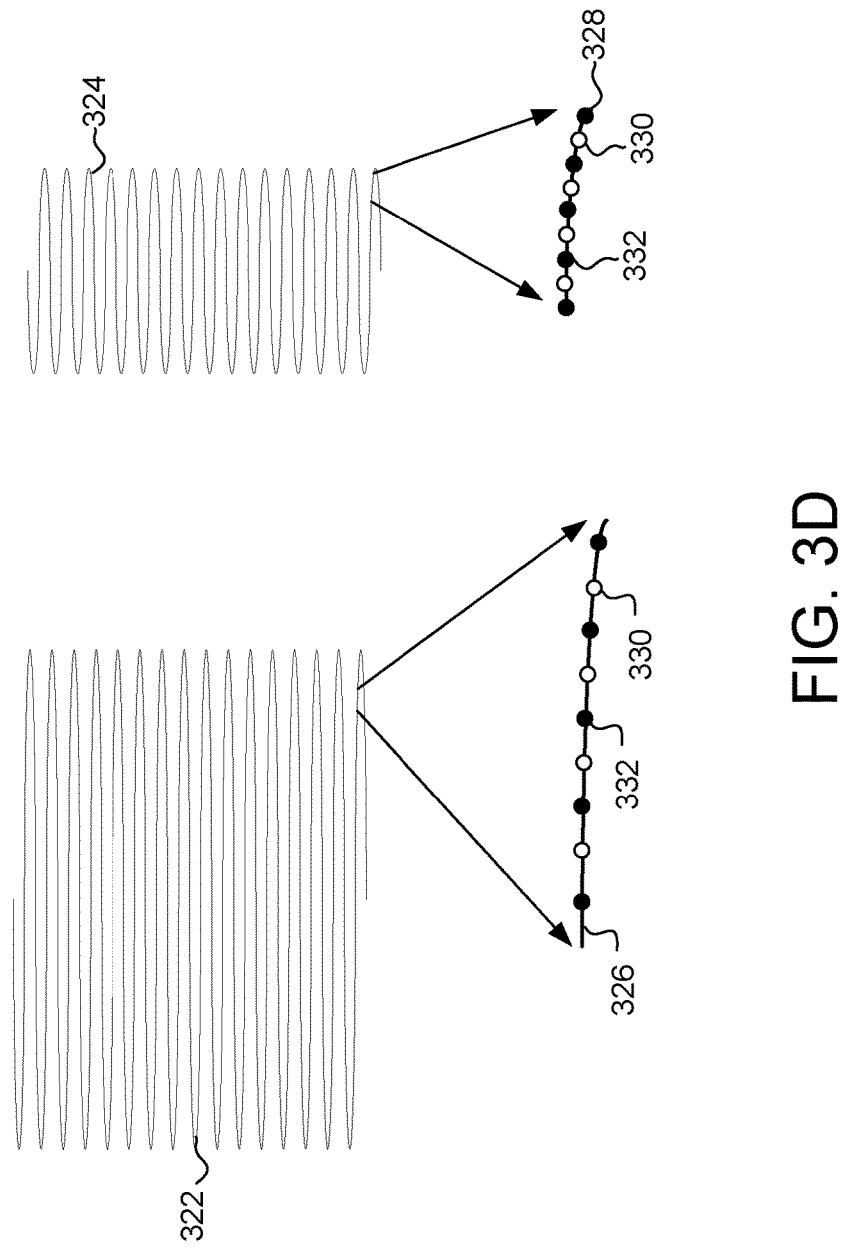

DEVICES AND METHODS FOR PROVIDING FOVEATED SCANNING LASER IMAGE PROJECTION WITH DEPTH MAPPING

FIELD

The present disclosure generally relates to depth mapping, and more particularly relates to depth mapping with scanning laser projectors.

BACKGROUND

In scanning laser projectors, images are projected by scanning laser light into a pattern, with individual pixels generated by modulating light from laser light sources as a scanning mirror scans the modulated light in the pattern. Depth mapping sensors have been developed to generate 3D maps of surfaces, where the 3D maps describe the variations in depth over the surface.

Past attempts to combine scanning laser projectors with depth mapping has been constrained by various limitations. For example, past attempts have been limited to providing depth mapping with specific resolutions. Additionally, past attempts to combine laser projection and depth sensing have been constrained by power limitations.

Furthermore, some previous methods of combing depth mapping and laser projection have had limited flexibility. As such, there remains a need for improved devices to combine scanning laser projectors with depth mapping. And there remains a need for improved devices and methods for depth mapping, and in particular a need for depth mapping and laser projection with improved flexibility.

BRIEF DESCRIPTION OF THE DRAWINGS

FIGS. 3A, 3B, 3C, 3D and 3E are graphical representations of vertical scan patterns and raster patterns in accordance with various embodiments of the present invention;

DESCRIPTION OF EMBODIMENTS

The embodiments described herein provide devices and methods for improved image projection. Specifically, the embodiments described herein provide the ability to project an image while also performing depth mapping, and in response to data from the depth mapping, to perform a dynamic modulation of the projected image. This dynamic modulation of the projected image can vary across the image. Thus, this dynamic modulation can provide foveated images as a response to the surfaces and objects on which the image is projected.

In general, the devices and methods described herein utilize at least one source of laser light to generate a laser beam, and scanning mirror(s) that reflect the laser beam into a pattern of scan lines. The source of light is controlled to selectively generate projected image pixels during a first portion of the pattern of scan lines, and to selectively generate depth mapping pulses during a second portion of the pattern of scan lines. The projected image pixels generate a projected image, while the depth mapping pulses are reflected from the surface, received, and used to generate a 3-dimensional point clouds that describe the measured surface depth at each point (e.g., provide a depth map of the surface). Thus, during each scan of the pattern both a projected image and a surface depth map can be generated.

The ability to project an image and generate a surface map during each scan can facilitate the dynamic modulation of the projected image. Specifically, the embodiments described herein can use the surface depth map generated during a scan as a basis for dynamically modifying a projected image that occurs during the same scan and/or subsequent scans. Furthermore, because depth mapping and image projection can both occur during each scan or subsequent, the image can be dynamically modified responsive to rapid changes in the surface depth map.

Figure 1:
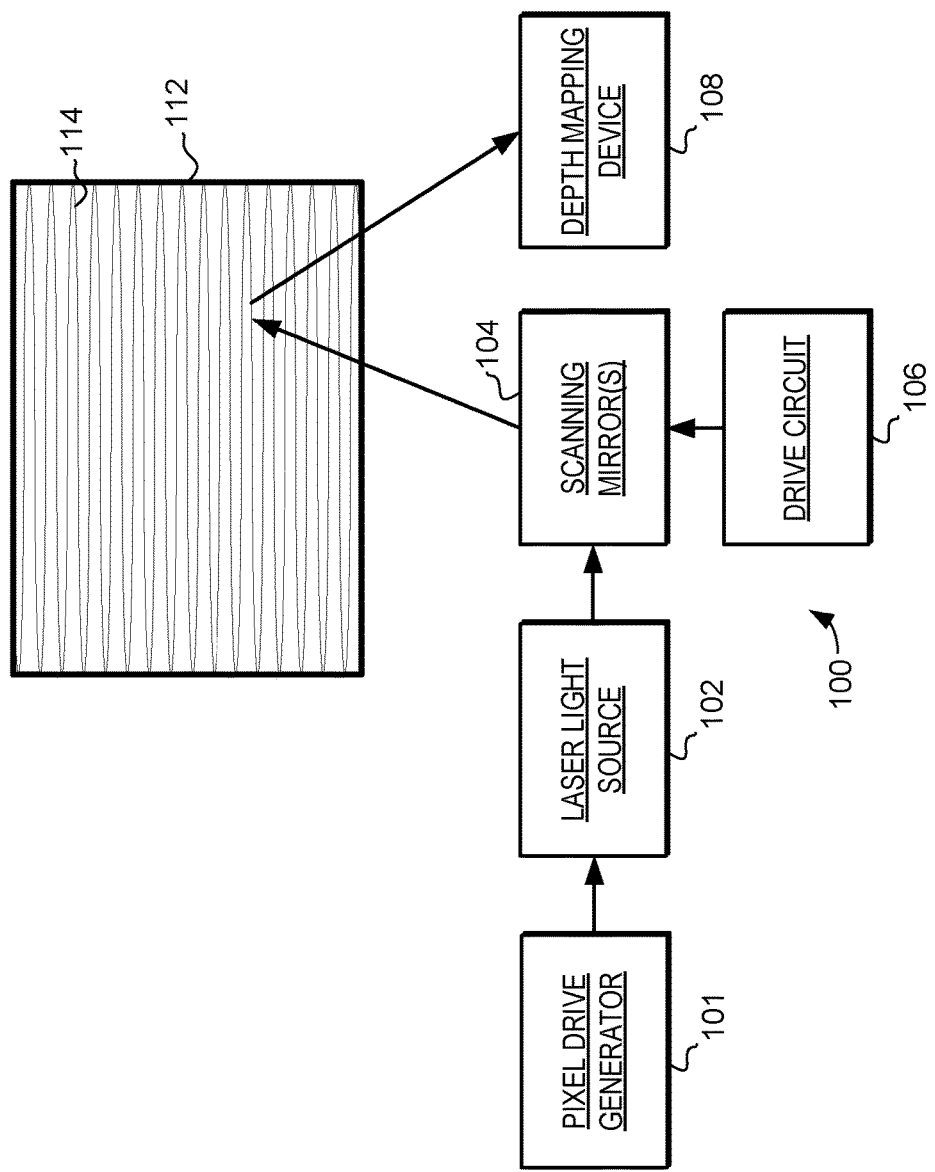
FIG. 1 shows a schematic diagram of a scanning laser projector in accordance with various embodiments of the present invention.

Turning now to FIG. 1, a schematic diagram of a scanning laser projector 100 is illustrated. The scanning laser projector 100 includes a pixel drive generator 101, a laser light source 102, scanning mirror(s) 104, a drive circuit 106, and a depth mapping device 108. During operation, the laser light source 102 generates a beam of laser light that is reflected by the scanning mirror(s) 104 into a pattern 114 of scan lines inside a scanning region 112. In the example of FIG. 1, the pattern 114 of scan lines comprises a raster pattern. However, this is just one example, and in other embodiments other patterns of scan lines can be generated as used. For example, spiral patterns and Lissajous patterns could instead be used. To facilitate this, the drive circuit 106 controls the movement of the scanning mirror(s) 104. Specifically, the drive circuit 106 provides excitation signal(s) to excite motion of the scanning mirror(s) 104.

To facilitate image projection, the pixel drive generator 101 encodes the beam of laser light with pixel data to generate image pixels during a first portion of the pattern 114 of scan lines. When scanned into the pattern 114 these projected image pixels generate a viewable image on the impact surface. In one embodiment, the laser light source 102, includes red, green and blue lasers that are used to generate projected image pixel.

To facilitate depth mapping, the pixel drive generator 101 encodes the beam of laser light is also encoded with pulses for depth mapping. In one embodiment, the laser light source 102 also includes an infrared laser that is used to generate the depth mapping pulses. The depth mapping device 108 is configured to receive reflections of the depth mapping pulses from the surface and generate a 3-dimensional point cloud of the surface based at least in part on the received reflections depth mapping pulses. For example, the depth mapping device 108 can be configured to calculate a time of flight for the return of each received depth mapping pulse. From this, the depth mapping device 108 can generate 3-dimensional point cloud of the surface.

It should be noted that the horizontal motion of the beam of laser light in the pattern 114 defines the rows of image pixels and/or data points in the 3-dimensional point cloud. The vertical motion of the beam of laser light in the pattern 114 defines a vertical scan rate, and thus determines the number of rows in the projected image and/or 3-dimensional point cloud.

Thus, the scanning laser projector 100 is configured to provide both image projection using generated image pixels and depth mapping using depth mapping pulses. In accordance with the embodiments described herein, the scanning laser projector 100 is further configured to provide modulation of projected images in response the depth mapping. Specifically, the pixel drive generator 101 can be configured to change or otherwise modulate the projection of image pixels in response to 3-dimensional point cloud generated by the depth mapping device 108. In some embodiments, the pixel drive generator 101 can modulate the projection of image pixels in response to a depth mapping performed during the current scan. As one detailed example, the pixel drive generator 101 can modulate the projection of image pixels during an active display period based on a depth mapping that was performed in an immediately preceding vertical retrace period. In such an embodiment the depth mapping pulses are projected during the vertical retrace period, and the projected image pulses are projected during the following active display period. Detailed examples of such an embodiment will be described below.

As another detailed example, the pixel drive generator 101 can modulate the projected image pixels based on a depth mapping that was performed in interlaced (e.g., alternating) scan lines. In such an embodiment the depth mapping pulses are projected during some scan lines, while the projected image pulses are projected during the interlaced (e.g., alternating) scan lines. As another detailed example, the pixel drive generator 101 can modulate the projection of image pixels based on a depth mapping that was performed with mapping pulses that were interlaced with image pixels. Again, detailed examples of such an embodiment will be described below. And it should be noted that regardless of scan type used, temporal and spatial collocation of the depth sensing and projection pulses is not precluded.

In each of these cases, the scanning laser projector 100 has the ability to project images while also performing surfacing mapping, and in response to data from the depth mapping perform a dynamic modulation of pixels in the projected images. Furthermore, because depth mapping and image projection can both occur during parts of the same scan, the projected images can be quickly modulated responsive to rapid changes in the surface depth map.

The pixel drive generator 101 can be configured to modulate the projected image pixels in a variety of ways. As one example, the pixel drive generator 101 can be configured to reduce the intensity of selected projected image pixels, while maintaining or increasing the intensity of other pixels. In such an embodiment, the projected image pixels can be selected for intensity reduction based on the depth mapping, e.g., based on the 3-dimensional point cloud that is determined using the depth mapping device 108. The pixel drive generator 101 can then reduce the intensity of the selected projected image pixels. In some embodiments the pixel drive generator 101 can instead be configured to increase the intensity of the selected pixels. And in yet other embodiments some pixels can be projected with increased intensity, while others are projected with reduced intensity.

The selection of projected image pixels for intensity modulation can also be performed with various techniques. As one example, a current 3-dimensional point clouds can be compared to a 3-dimensional point cloud generated during a previous scan. As another example, 3-dimensional point clouds can be generated from multiple depth mapping scans and compared. In either case such a comparison can be used to locate changes in the scanning region 112.

For example, such a comparison can be used to locate an object in the scanning region 112. And in such an embodiment, the comparison can be used to track a moving object through the scanning region 112. With the location of such an object determined the pixels inside and/or outside the object can be modulated. For example, the intensity of pixels inside the object location can be modulated in a first way, and the intensity of the pixels outside the object location can be modulated in a second way, different from the first way.

As more specific examples, the image pixels can be modulated by not projecting pixels outside the object location, while continuing the project pixels on the object location. Such a system can be used to facilitate projection onto a moving object, such as a moving screen or other moving surface on which the image is to be projected. In such an embodiment the pixel drive generator 101 can be controlled to turn off pixels that would not be projected onto the moving object.

Alternatively, the image pixels can be modulated by not projecting pixels on the object location, while continuing the project pixels outside the object location. Such a system can be used to prevent pixels from being projected on one object while the image continues to be projected around the object.

For example, the system can be used to prevent pixels from being projected on a person standing in front of a display screen, where otherwise such projection can be an irritation to the person. In this embodiment multiple 3-dimensional point clouds can be generated and compared to locate a person in the scanning region, and the pixel drive generator 101 can be controlled to reduce the intensity or turn off pixels that would projected onto the person.

In some embodiments, depth mapping can be performed during multiple portions of each scan, while image projection is performed during another portion. For example, depth mapping can be performed both during the vertical retrace period, and during some portion of the active display period. Such a configuration can facilitate improve flexibility in the ability to generate the 3-dimensional point clouds of depth mapping and modulate projected image pixels in response to the depth mapping.

For example, a relatively coarse mapping can be made based on received reflections during a vertical retrace period, and a relatively detailed mapping made based on received reflections during an active display period. As another example, a region of interest can be identified based on received reflections during a vertical retrace period and determining a detailed mapping of the region of interest during an active display period. Detailed examples of such embodiments will be described in greater detail below.

Figure 2:
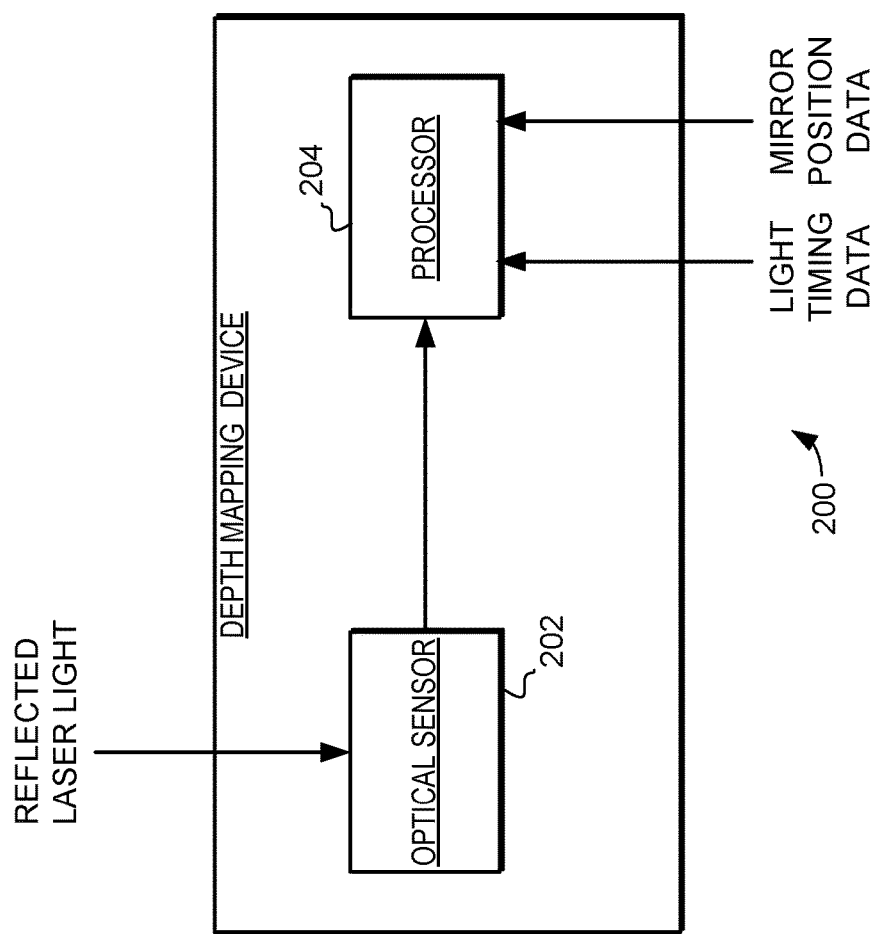
FIG. 2 shows a schematic view of a depth mapping device in accordance with various embodiments of the present invention.

Turning now to FIG. 2, a more detailed embodiment of a depth mapping device 200 is illustrated. In FIG. 2, the depth mapping device 200 includes an optical sensor 202 and a processor 204. In general, the optical sensor 202 is configured to receive laser light reflected from a surface and generate signals proportional to the received laser light reflections. Those signals are passed to the processor 204. In some embodiments those signals can be filtered, synthesized or otherwise processed prior to sending to the processor 204, while in other embodiments those signals can be processed by the processor 204. The processor 204 also receives light timing data from the light source (e.g., laser light source 102). This light timing data describes the timing of the depth mapping pulses projected on to the surface. Likewise, the processor 204 receives mirror position data from the drive circuit (e.g., drive circuit 106). The mirror position data describes the position of the mirror as it relates to each depth mapping pulse. The processor 204 receives the signals from the optical sensor 202, the light timing data and mirror position data, and generates a 3-dimensional point cloud of the surface.

In one embodiment, the laser light source 102 can be configured to generate pulses of infrared laser light during the pattern scan over a surface (e.g., raster pattern). Each pulse of infrared laser light is reflected off the surface and received by the optical sensor 202, and each pulse of reflected laser light can then correspond to one point in the 3-dimensional point cloud. In such an embodiment the optical sensor 202 can comprise any suitable sensor. For example, the optical sensor 202 could be implemented with a suitable photodiode implemented to be sensitive to infrared light, including silicon photodiodes and avalanche photodiodes. In other embodiments, the optical sensor 202 could be implemented with a silicon photomultiplier or photomultiplier tubes. It should finally be noted that in some embodiments other types of laser may be used to generate the pulses, including visible light lasers.

The processor 204 is coupled to the optical sensor 202 and generates 3-dimensional point clouds that describe the surface depth. In one embodiment, the processor 204 generates the 3-dimensional point cloud by calculating a time of flight for each pulse that is reflected back and received by the optical sensor. Specifically, the time of flight for each pulse to travel from the light source to the surface, and back to the optical sensor 202 can be determined at least in part by light timing data and the signals from the optical sensor 202. The location on the surface corresponding to each pulse can be determined at least in part from the mirror position data. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface.

To facilitate this, the processor 204 can be implemented with any suitable type of processing system or device. For example, the processor 204 can be implemented with software implemented programs that are loaded into memory and executed on hardware, where the hardware utilizes integrated circuits designed to execute such programs. In other embodiments, the processor 204 can be implemented exclusively in hardware or in combinations of hardware and software. For example, the processor 204 can be implemented to include application-specific integrated circuits (ASICs) designed for this specific application, or general purpose central processing units (CPUs) that commonly provide processing functionality on computing devices. Furthermore, system on chip (SoC) processors can integrate a variety of system components into a single integrated device, and may include digital, analog, optical, and other functions on a single semiconductor substrate.

As was noted above, during operation of a scanning laser projector a laser beam is reflected off scanning mirror(s) to generate a pattern of scan lines (e.g., a raster pattern as illustrated in FIG. 1). This raster pattern of scan lines determines in part the resolution of the projected image and/or the resolution of the scan and the resulting 3-dimensional point cloud describing the surface depth. In general, the "slow axis" of the raster pattern is the vertical axis, while the "fast axis" is the horizontal axis, recognizing that the terms "vertical" and "horizontal" are essentially arbitrary in this context as they are determined by the orientation of the scanning laser projector. To generate such a raster pattern, the vertical scan motion of the mirror can follow a relatively slow, sawtooth-like pattern, while the horizontal scan motion follows a relatively fast, sinusoidal-like pattern.

Figure 3A:
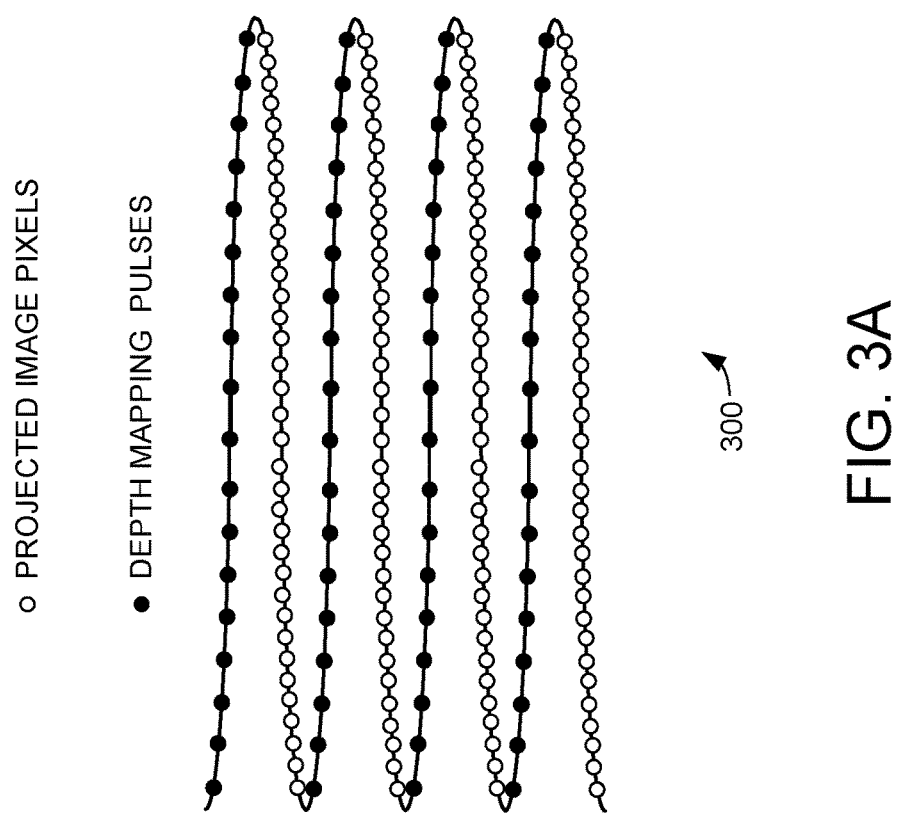

The laser light source is controlled to selectively generate projected image pixels during a first portion of the raster pattern and to selectively generate depth mapping pulses during a second portion of the raster pattern. In one embodiment these first and second portions can comprises scan lines that move in opposite directions. Turning now to FIG. 3A, a simplified example portion of a raster pattern 300 is illustrated. Also illustrated in FIG. 3A are the projected image pixels (identified with white dots) and depth mapping pulses (identified with black dots). It should be noted that FIG. 3A is not drawn to scale, and that a typical raster pattern would include many more horizontal scan lines and many more image pixels and/or mapping pulses. It should also be noted that the ratio of image pixels to mapping pulses can be changed. For example, in other embodiments equal numbers of image pixels to mapping pulses can be used. In yet other embodiments, a greater ratio of image pixels to mapping pulses can be used.

As illustrated in FIG. 3A, the projected image pixels are projected during horizontal scan lines that move in one direction (i.e., a first portion), and the depth mapping pulses are projected during horizontal scan lines that move in a second direction (i.e., a second portion), where the second direction is opposite the first direction. Stated another way, the scan lines in which the projected image pixels are generated are interlaced with the scan lines in which the depth mapping pulses are generated.

It should be noted that in this example the effective vertical resolution of the resulting projected image is reduced in half compared to an image that is projected using all the horizontal scan lines. Likewise, the vertical resolution of a resulting 3-dimensional point cloud is reduced in half compared to a scan that uses all the horizontal scan lines to generate such a point cloud. However, as will be discussed below, the number of horizontal scan lines can be modified by modifying the vertical scan rate.

It should also be noted that while FIG. 3A shows an example raster pattern 300 where individual scan lines with projected image pixels alternate with individual scan lines with depth mapping pulse this is just one example and that other implementations are possible. For example, the raster pattern 300 could be modified to have multiple scan lines of projected image pixels and/or multiple scan lines of depth mapping pulses together, and could thus alternate in different patterns. As one specific example, the raster pattern 300 could be modified to have two scan lines of projected image pixels followed by one scan line of depth mapping pulses, repeating in a 2-1-2-1 arrangement over the raster pattern 300. As other detailed examples, the raster pattern 300 could be modified to have an arrangement of 2-2-2-2, 4-1-4-1, or 3-2-3-2. Each of these variations can provide different resolution levels for projected image and/or 3-dimensional point cloud and may be desirable for some embodiments. It should be noted that while some patterns with uneven distributions could result in image artifacts, that such artifacts may be limited by swapping or alternating individual image pixels with mapping pulses in consecutive frames.

FIG. 3A thus illustrates a technique in which a scanning laser projector (e.g., scanning laser projector 100) can be configured to provide both image projection using generated image pixels and depth mapping using depth mapping pulses. In accordance with the embodiments described herein, the scanning laser projector can be further configured to provide modulation of projected images in response to the depth mapping. Specifically, a pixel drive generator (e.g., pixel drive generator 101) can be configured to change or otherwise modulate the projection of image pixels in response to 3-dimensional point cloud generated by a depth mapping device (e.g., depth mapping device 108).

In the embodiment of FIG. 3A, the pixel drive generator can modulate the projection of image pixels in response to a depth mapping performed during the current scan. Specifically, pixel drive generator can modulate the projected image pixels based on a depth mapping that was performed in interlaced (e.g., alternating) scan lines as illustrated in FIG. 3A. In such an embodiment the depth mapping pulses are projected during some scan lines, while the projected image pulses are projected during the interlaced (e.g., alternating) scan lines.

Figure 3B:
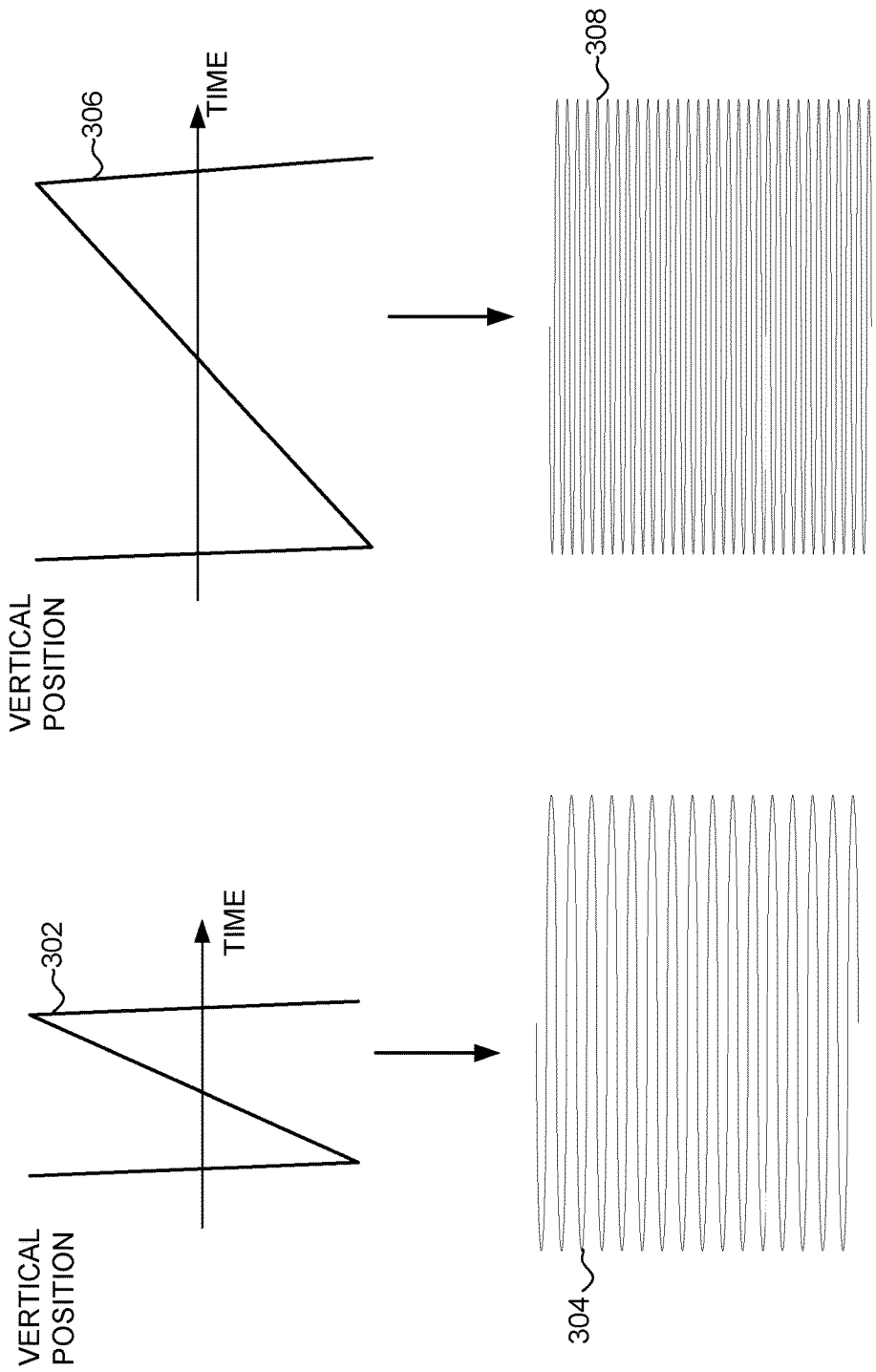

As mentioned above, the number of horizontal scan lines in a raster pattern can be modified by modifying the vertical scan rate. Turning now to FIG. 3B, a first vertical scan pattern 302, a first raster pattern 304, a modified vertical scan pattern 306, and a modified raster pattern 308 are illustrated. It should be noted that in these examples, the vertical scan patterns 302 and 306 include a relatively short vertical retrace period (occurring during the steep downward sloping portion of the sawtooth pattern) and a relatively long active display period (occurring during the relatively shallow upward sloping section of the sawtooth pattern). In such embodiments the raster patterns 304 and 308 would be generated during the active display periods, while the relatively short vertical retrace period is used to return the mirror to the original vertical position after each raster pattern.

In general, these graphs illustrate how a dynamic decrease in the vertical scan rate can be used to increase the vertical resolution. Specifically, this decrease in the vertical scan rate can increase the number of horizontal lines, and can thus be used to increase the resolution of the projected image and/or the resulting 3-dimensional point cloud of the surface.

Specifically, the first vertical scan pattern 302 is a relatively fast sawtooth pattern, and this relatively fast pattern results in the first raster pattern 304. Conversely, the modified vertical scan pattern 306 is a relatively slow sawtooth pattern, and that relatively slow pattern results in the second raster pattern 308. As can be seen in FIG. 3B, reducing the vertical scan rate to a relatively slower sawtooth pattern results in the reduced spacing between the horizontal lines of the resulting raster pattern. This reduced spacing results in more horizontal scan lines over a given vertical distance, and thus increases the vertical resolution and vertical data density of the scan. Conversely, increased spacing between horizontal lines results in less horizontal scan lines over a given vertical distance, and thus decreases the vertical resolution of the scan.

Decreasing the vertical scan rate to increase the number of horizontal lines can compensate for scan lines that are used depth mapping. Specifically, when such an increase in the number of horizontal lines is combined with alternating lines of projected image pixels and depth mapping pulses (as illustrated in FIG. 3A) such techniques can provide both image projection and depth mapping in each frame, while maintaining the resolution of the projected image and/or depth mapping scan. Of course, such a decrease in the vertical scan rate will also decrease the frame rate of the projected image, and thus this may not be desirable for all applications.

Thus, in accordance with an embodiment described herein, a drive circuit (e.g., drive circuit 106) can be configured to selectively decrease the vertical scan rate to increase the vertical resolution of the resulting projected image and/or 3-dimensional point cloud of the surface. Conversely, the drive circuit can be configured to selectively increase the vertical scan rate to decrease the vertical resolution of the resulting projected image and/or 3-dimensional point cloud.

Figure 3C:
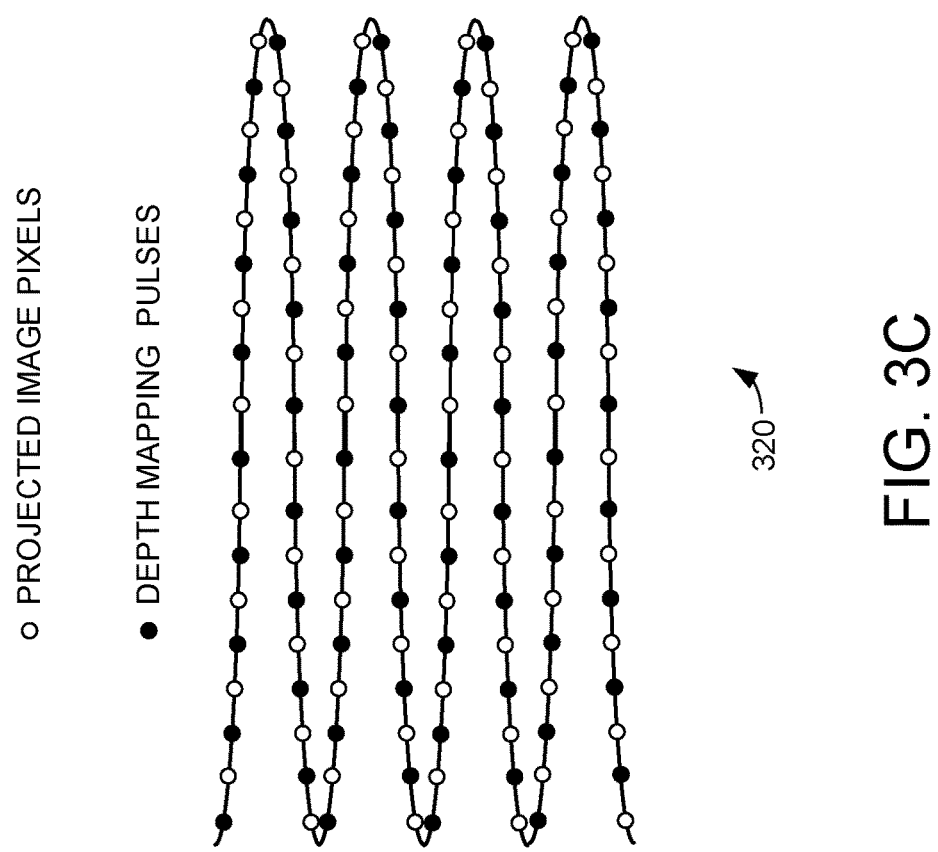

Again, the laser light source is controlled to selectively generate projected image pixels during a first portion of the raster pattern and to selectively generate depth mapping pulses during a second portion of the raster pattern. In another embodiment these first and second portions can comprises alternating locations in the horizontal scan lines. Turning now to FIG. 3C, a simplified example portion of a raster pattern 320 is illustrated, with projected image pixels again identified with white dots and depth mapping pulses again identified with black dots. Again, FIG. 3C is not drawn to scale, and a typical raster pattern would include many more horizontal scan lines and many more image pixels and/or mapping pulses.

As illustrated in FIG. 3C, the projected image pixels alternate with the depth mapping pulses in the horizontal scan lines. Stated another way, the projected image pixels are interlaced with the depth mapping pulses in the horizontal scan lines.

It should also be noted that while FIG. 3C shows an example raster pattern 320 where individual projected image pixels alternate with individual depth mapping pulses, this is just one example and that other implementations are possible. For example, the raster pattern 320 could be modified to have multiple consecutive pixels and/or pulses. Thus, the projected image pixels and depth mapping pulses could alternate in different patterns. As one specific example, the raster pattern 320 could be modified to have three image pixels followed by one mapping pulse, repeating in a 3-1-3-1 arrangement over each horizontal line the raster pattern 320. As other detailed examples, the raster pattern 320 could be modified to have pixel/pulse arrangements of 2-2-2-2, 4-1-4-1, or 3-2-3-2. Again, each of these variations can provide different resolution levels for projected image and/or 3-dimensional point cloud and may be desirable for some embodiments. And again, it should be noted that while some patterns with uneven distributions could result in image artifacts, that such artifacts may be limited by swapping or alternating individual image pixels with mapping pulses in consecutive frames.

FIG. 3C thus illustrates another technique in which a scanning laser projector (e.g., scanning laser projector 100) can be configured to provide both image projection using generated image pixels and depth mapping using depth mapping pulses. In accordance with the embodiments described herein, the scanning laser projector can be further configured to provide modulation of projected images in response to the depth mapping. Specifically, a pixel drive generator (e.g., pixel drive generator 101) can be configured to change or otherwise modulate the projection of image pixels in response to 3-dimensional point cloud generated by a depth mapping device (e.g., depth mapping device 108).

In the embodiments of FIG. 3C, the pixel drive generator can modulate the projection of image pixels in response to a depth mapping performed during the current scan. Specifically, pixel drive generator can modulate the projected image pixels based on a depth mapping that was performed with mapping pulses that were interlaced with image pixels, as illustrated in FIG. 3C.

It should be noted that in some applications, various constraints may prevent image projection and depth pulses from being temporally collocated. For example, various system or application constraints like power consumption or laser power output can prevent such pulses from being temporally collocated. In such applications, the effective horizontal resolution of the resulting projected image may instead be reduced compared to implementations where only projected image pixels are generated. To compensate for such a reduction the horizontal scan amplitude can also be adjusted.

Turning now to FIG. 3D, a first raster pattern 322 and modified raster pattern 324 are illustrated. Also illustrated is an expanded portion 326 of the first raster pattern 322, and an expanded portion 328 of the modified raster pattern 324. The expanded portion 326 and expanded portion 328 both illustrate exemplary projected image pixels 330 and depth mapping pulses 332. Again, it should be noted that these illustrative features are merely illustrative, and are not necessarily drawn to scale.

In general, these graphs illustrate how a dynamic decrease in the horizontal scan amplitude can provide increased horizontal resolution and horizontal data density in a projected image and/or 3-dimensional point cloud of the surface. Specifically, the decrease in the horizontal scan amplitude results in a decrease in spacing between adjacent pixels and pulses generated by the laser light source as they impact the surface. Furthermore, it should be noted that the decrease in horizontal scan amplitude will reduce the field of view and throw ratio of the projected image. Thus, in some embodiments it may be desirable to perform similar changes to amplitudes in both the horizontal and vertical directions to maintain the aspect ratio of the projected image.

Specifically, the first raster pattern 322 has a relatively large horizontal amplitude, and this horizontal amplitude results in relatively wide spacing between pixels and pulses. Conversely, the modified raster pattern 324 has a relatively small horizontal amplitude, and assuming an equal pixel rates this relatively small amplitude results in relatively close spacing between pixels and pulses.

In addition to the examples shown above, other variations can be used. For example, if the power consumption or laser output power is not constrained, then depth pulses can be temporally and spatially coincident with each other. Specifically, having image pixels and depth pulses fully overlap all the time can be acceptable for applications where eye safety is not concern or where the laser power is low enough.

Figure 3E:
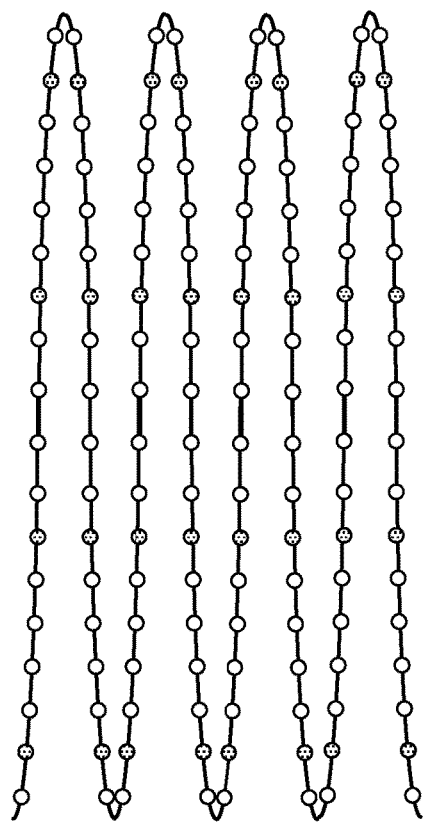

Turning now to FIG. 3E, a simplified example portion of a raster pattern 360 is illustrated, with projected image pixels again identified with white dots and overlapping depth mapping pulses and projected image pixels identified with cross-hatched dots. Again, FIG. 3E is not drawn to scale, and a typical raster pattern would include many more horizontal scan lines and many more image pixels and/or mapping pulses.

As illustrated in FIG. 3E, the depth mapping pulses are overlapping with some portion of the projected image pixels. Thus, FIG. 3E is an example where projected image pixels and depth mapping pulses are temporally and spatially coincident with each other. In this illustrated example, the depth mapping pulses overlap with each $5^{th}$ projected image pixels. It should also be noted that this pattern is just one example, and other implementations are possible. For example, the raster pattern 360 could be modified to have overlapping projected image pixels and depth mapping pulses every $3^{rd}$, $10^{th}$, $20^{th}$ pixel. In another example, the raster pattern 360 could be modified to have overlapping projected image pixels and depth mapping pulses at every pixel. Additionally, there is no requirement that all the rows in the scan have the same pattern. Again, each of these variations can provide different resolution levels for projected image and/or 3-dimensional point cloud and may be desirable for some embodiments.

FIG. 3E thus illustrates another technique in which a scanning laser projector (e.g., scanning laser projector 100) can be configured to provide both image projection using generated image pixels and depth mapping using depth mapping pulses. In accordance with the embodiments described herein, the scanning laser projector can be further configured to provide modulation of projected images in response to the depth mapping. Specifically, a pixel drive generator (e.g., pixel drive generator 101) can be configured to change or otherwise modulate the projection of image pixels in response to 3-dimensional point cloud generated by a depth mapping device (e.g., depth mapping device 108).

In addition to the examples shown in FIGS. 3A-3E, other variations can be used. As another specific example, in some implementations image pixels and depth mapping pulses can be made to alternate on a frame-by-frame basis. In such an embodiment, half of the frames include image pixels and the other include depth pulses. Such an implementation would reduce the image frame rate by one-half, but this may be sufficient in some applications.

FIGS. 3A-3E thus show various ways in which a scanning laser projector (e.g., scanning laser projector 100) can be configured to provide both image projection using generated image pixels and depth mapping using depth mapping pulses. In accordance with the embodiments described herein, the scanning laser projector can be further configured to provide modulation of projected images in response to the depth mapping. Specifically, a pixel drive generator (e.g., pixel drive generator 101) can be configured to change or otherwise modulate the projection of image pixels in response to 3-dimensional point cloud generated by a depth mapping device (e.g., depth mapping device 108).

In each of these cases, the scanning laser projector has the ability to project images while also performing surfacing mapping, and in response to data from the depth mapping perform a dynamic modulation of pixels in the projected images. Furthermore, because depth mapping and image projection can both occur during parts of the same scan, the projected images can be quickly modulated responsive to rapid changes in the surface depth map.

The pixel drive generator can be configured to modulate the projected image pixels in a variety of ways. As one example, the pixel drive generator can be configured to reduce the intensity of selected projected image pixels, while maintaining or increasing the intensity of other pixels. In such an embodiment, the projected image pixels can be selected for intensity reduction based on the depth mapping, e.g., based on the 3-dimensional point cloud that is determined using the depth mapping device. The pixel drive generator can then reduce the intensity of the selected projected image pixels. In some embodiments the pixel drive generator can instead be configured to increase the intensity of the selected pixels. And in yet other embodiments some pixels can be projected with increased intensity, while others are projected with reduced intensity.

The selection of projected image pixels for intensity modulation can also be performed with various techniques. As one example, a current 3-dimensional point clouds can be compared to a 3-dimensional point cloud generated during a previous scan. As another example, 3-dimensional point clouds can be generated from multiple depth mapping scans and compared. In either case, such a comparison can be used to locate changes in the scanning region. In yet other implementations, shaper classifier methods or shape/image fit techniques can be employed.

Figure 4A:
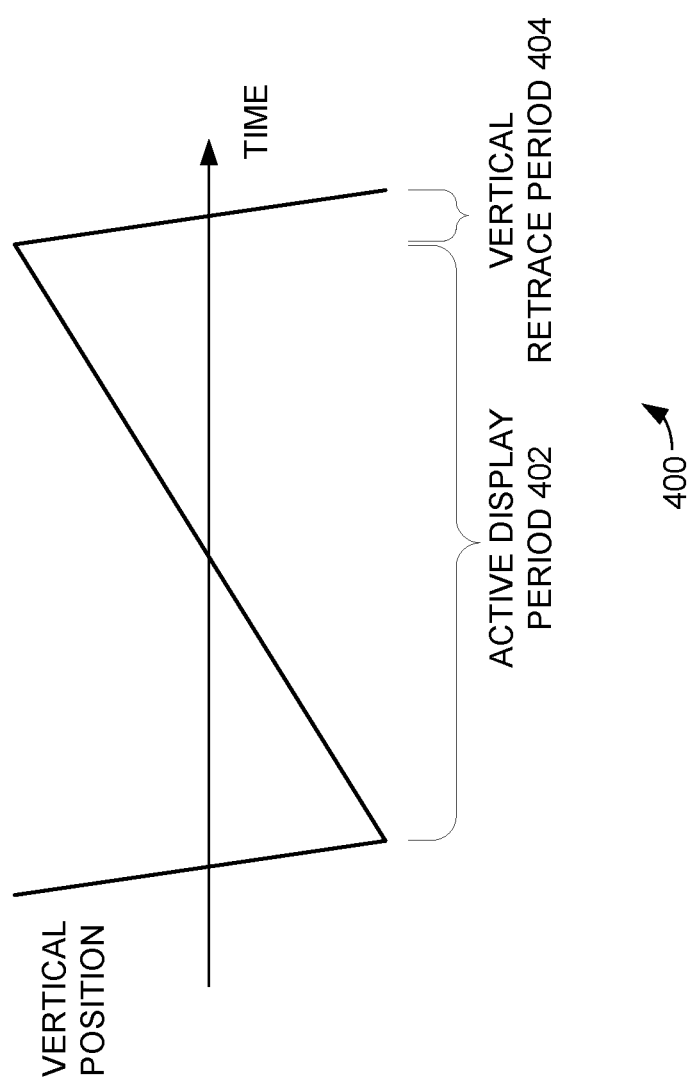
FIGS. 4A and 4B are graphical representations of a vertical scan pattern and raster pattern in accordance with various embodiments of the present invention.

As was described above, in some embodiments the first portion of the raster pattern of scan lines comprises the scan lines generated during an active display period, and the second portion of the raster pattern of scan lines comprises the scan lines generated during a vertical retrace period. Turning now to FIG. 4A, an exemplary vertical scan pattern 400 is illustrated. The vertical scan pattern 400 includes an active display period 402 and a vertical retrace period 404. Specifically, the vertical scan pattern 400 is a sawtooth-like pattern, with a relatively long active display period 402 and a relatively short vertical retrace period 404. Because of this, such sawtooth-like patterns are typically used to generate a projected image during the active display period 402 the relatively short vertical retrace period 404 is used to return the mirror to the original vertical position.

However, in the embodiments described the relatively short vertical retrace period 404 can also be used to generate the 3-dimensional point cloud of the surface. Thus, projected image pixels can be generated during the active display portion 402 and depth mapping pulses generated during the vertical retrace period 404. However, because the active display period 402 is much longer than the vertical retrace period 404, the resulting raster pattern will include many more rows of image pixels compared to the number of rows of depth mapping pulses.

Figure 4B:
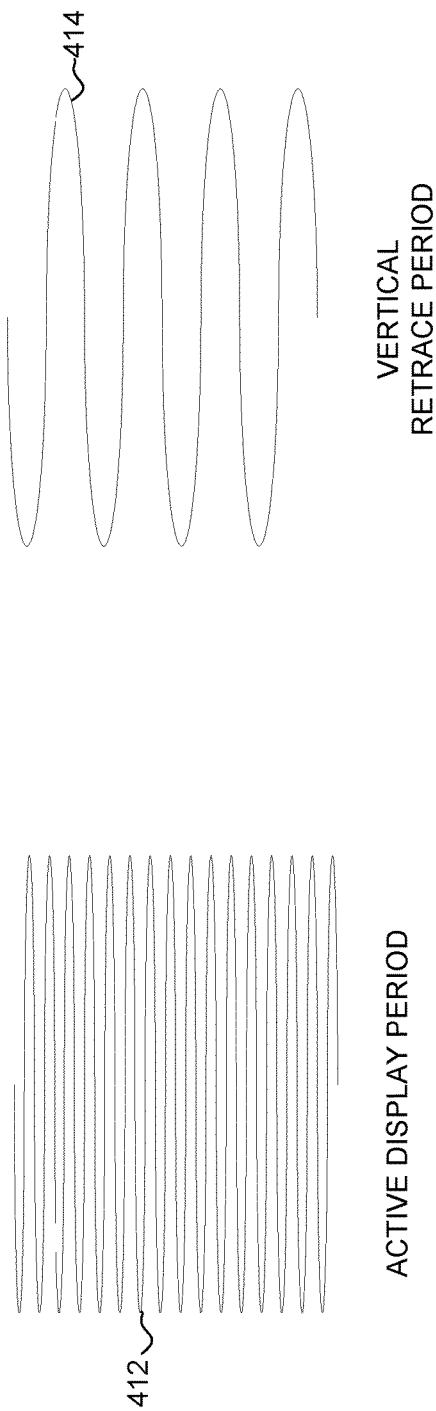

Turning to FIG. 4B, an exemplary raster patter 410 is illustrated. The raster pattern 410 illustrates the first portion of the raster pattern 412 generated during the active display period, and the second portion of the raster pattern 414 generated during the vertical retrace period. Again, in this example projected image pixels can be generated during the first portion of the raster pattern 412, and depth mapping pulses generated during the second portion of the raster pattern 414. As can be seen in FIG. 4B, the first portion of the raster pattern 412 has many more horizontal rows than the second portion of the raster pattern 414. Thus, the projected image will have a relatively high vertical resolution, while the generated 3-dimensional point cloud will have a relatively low vertical resolution.

FIGS. 4A-4B thus show other techniques by which a scanning laser projector (e.g., scanning laser projector 100) can be configured to provide both image projection using generated image pixels and depth mapping using depth mapping pulses. In accordance with the embodiments described herein, the scanning laser projector can be further configured to provide modulation of projected images in response the depth mapping. Specifically, a pixel drive generator (e.g., pixel drive generator 101) can be configured to change or otherwise modulate the projection of image pixels in response to 3-dimensional point cloud generated by a depth mapping device (e.g., depth mapping device 108).

In the embodiments of FIG. 4A and 4B, the pixel drive generator can modulate the projection of image pixels in response to a depth mapping performed during the current scan. Specifically, the pixel drive generator can modulate the projection of image pixels during an active display period (e.g., active display period 402 and the corresponding first portion of the raster pattern 412) based on a depth mapping that was performed in an immediately preceding vertical retrace period (e.g., vertical retrace period 404 and the corresponding second portion of the raster pattern 414).

In other embodiments, depth mapping can be performed during multiple portions of each scan, while image projection is performed during another portion. In such an embodiment the techniques of FIGS. 3A-3E and 4A-4B can be combined to provide such flexibility in depth mapping. For example, depth mapping can be performed both during the vertical retrace period, and during some portion of the active display period.

As a first detailed example, depth mapping can be performed during the vertical retrace period (e.g., vertical retrace period 404) and then additional depth mapping can be performed with depth mapping pulses during interlaced (e.g., alternating) scan lines of the active display period (e.g., active display period 402). In this embodiment the technique illustrated in FIG. 4B is combined with the technique of FIG. 3A to provide depth mapping during two different portions of the scan. Furthermore, in such an embodiment image projection can be performed during a third portion of the scan (e.g., during the other interlaced (e.g., alternating) scan lines of the active display period).

As a second detailed example, depth mapping can be performed during the vertical retrace period (e.g., vertical retrace period 404) and then additional depth mapping can be performed with depth mapping pulses that alternate with projected image pixels in the horizontal scan lines in the active display period (e.g., active display period 402). Stated another way, the depth mapping during the vertical retrace period is combined with depth mapping pulses that are interlaced with projected image pixels in the horizontal scan lines of the active display period. Thus, in this embodiment the technique illustrated in FIG. 4B is combined with the technique of FIG. 3C to provide depth mapping during two different portions of the scan, while image projection can be provided during a third portion of the scan (e.g., during the alternating pixels).

Either of these two embodiments can facilitate improve flexibility in the ability to generate the 3-dimensional point clouds of depth mapping and modulate projected image pixels in response to the depth mapping.

For example, because there are less horizontal lines in vertical retrace period, a relatively coarse mapping can be made based on received reflections during the vertical retrace period. This relatively coarse mapping will involve fewer depth mapping pulses and thus can require less power and computer resources. Then, a relatively detailed mapping can be made during the active display period. This relatively detailed mapping can have result in more rows and columns in the 3-dimensional map. Such a technique thus allows both a relatively coarse and a relatively detailed 3-dimensional map to be generated during each scan. These two maps can then be used independently, or alternatively they can be combined to provide additionally depth information.

For example, the relatively coarse mapping generated during the vertical retrace period can be used to identify one or more regions of interest in scanning region. These regions of interest can correspond to particular shapes and shapes and features. For example, these regions of interest can correspond to particular areas where the image will or will not be projected.

With these regions of interest identified in the relatively coarse mapping provided during the vertical retrace period, a more detailed mapping of these identified regions of interest can be performed during the active display period. Furthermore, because this relatively detailed mapping can be limited to the regions of interest identified in the coarse mapping, the power and resources used in the detailed mapping can be conserved. Stated another way, the coarse mapping can be used to identify areas where the detailed mapping does not need to be performed. This can again conserve power and computing resources that would otherwise be used to generate the detailed mapping in areas where it is not needed.

Figure 5B:
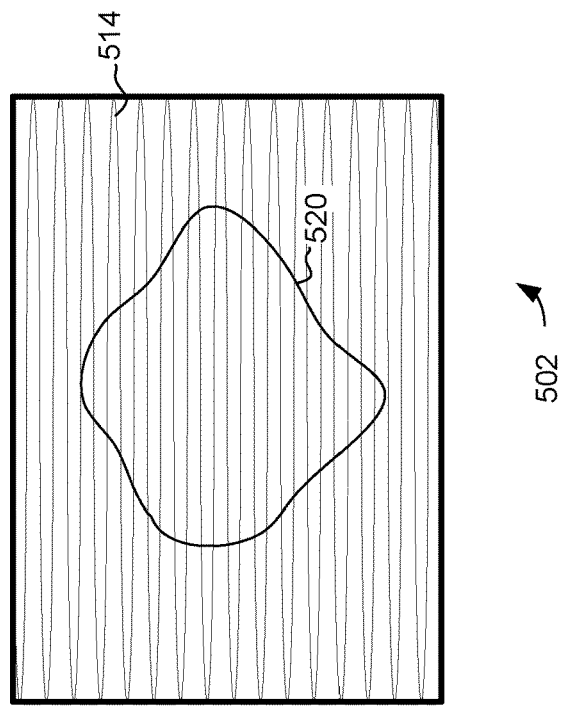
FIGS. 5A and 5B are graphical representations of scanning regions in accordance with various embodiments of the present invention.
Figure 5A:
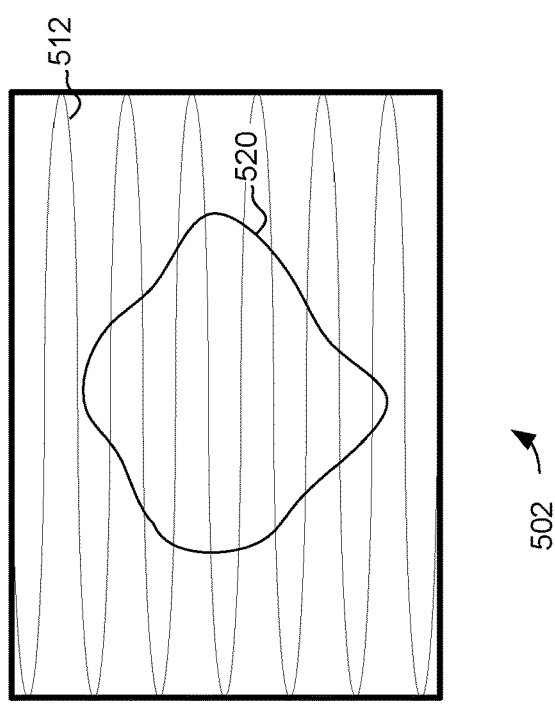

Turning now to FIGS. 5A and 5B, an exemplary scanning region 502 is illustrated. Scanning region 502 is illustrated with a first exemplary scanning pattern 512 in FIG. 5A and with a second exemplary pattern 514 in FIG. 5B. Inside the scanning region 502 is a region of interest 520. This region of interest 520 can correspond to any surface, shape or structure for which a detailed scan is desirable.

The first exemplary scanning pattern 512 is exemplary of the type of pattern that can be generated in the vertical retrace period. As such, the first exemplary scanning pattern 512 includes relatively fewer horizontal lines, and thus when used for depth mapping would result in a relatively coarse mapping of the scanning region 502 and the region of interest 520. Again, this relatively coarse mapping will use fewer depth mapping pulses and thus can require less power and computer resources. However, the relatively coarse scan provided by the scanning pattern 512 can be used to identify and locate the region of interest 520. For example, by identifying an approximate perimeter of the corresponding shape or surface that defines the region of interest 520.

The second exemplary scanning pattern 514 is exemplary of the type of pattern that can be generated during the active display period. During the active display period a much larger number of horizontal scan lines are generated, and this larger number of horizontal scan lines results in more rows of data in the depth map. As such, the second exemplary scanning pattern 514 can be used to generate a relatively detailed mapping of the scanning region having significantly higher resolution. Furthermore, in one embodiment, this relatively detailed mapping can be limited to the region of interest 520 identified in the coarse mapping generated with first exemplary scanning pattern 512. In such an embodiment the pixel drive generator could be controlled to not generate depth mapping pulses outside the region of interest 520. This facilitates power and other resource conservation, while still providing a relatively detailed mapping of the region of interest 520.

Thus, the coarse mapping provided by the first exemplary scanning pattern 512 can be used to identify areas where the detailed mapping does not need to be performed during the more detailed second exemplary scanning pattern 514. This can again conserve power and computing resources that would otherwise be used to generate the detailed mapping in areas where it is not needed.

As was described above, in each of the embodiments of FIGS. 3A-3E, 4A-4B and 5A-5B, the scanning laser projector has the ability to project images while also performing surfacing mapping, and in response to data from the depth mapping perform a dynamic modulation of pixels in the projected images. Furthermore, because depth mapping and image projection can both occur during parts of the same scan, the projected images can be quickly modulated responsive to rapid changes in the surface depth map.

To facilitate this, the pixel drive generator (e.g., pixel drive generator 101) can be configured to modulate the projected image pixels in a variety of ways. As one example, the pixel drive generator can be configured to reduce the intensity of selected projected image pixels, while maintaining or increasing the intensity of other pixels. In such an embodiment, the projected image pixels can be selected for intensity reduction based on the depth mapping, e.g., based on the 3-dimensional point cloud that is determined using a depth mapping device (e.g., depth mapping device 108).

The pixel drive generator can then reduce the intensity of the selected projected image pixels. In some other embodiments, the pixel drive generator can instead be configured to increase the intensity of the selected pixels. And in yet other embodiments some pixels can be projected with increased intensity, while others are projected with reduced intensity.

In yet other examples, the selected projected image pixels can be changed in other ways. For example, the selected image pixels can be modified in color and/or duration. As one specific example, the selected image pixels can be changed to project images or a video from a different image/video source. In such a device, images from one source can be projected outside an object, while images from another source are projected on the object.

The selection of projected image pixels for intensity modulation can also be performed with various techniques. As one example, a new or current 3-dimensional point clouds can be compared to a previously generated 3-dimensional point cloud generated during a previous scan. As another example, 3-dimensional point clouds can be generated from multiple depth mapping scans and compared. In either case, such a comparison can be used to locate changes in the scanning region. In yet other implementations, shaper classifier methods or shape/image fit techniques can be employed.

For example, such a comparison can be used to locate an object in the scanning region. And in such an embodiment, the comparison can be used to track a moving object through the scanning region. With the location of such an object determined the pixels inside and/or outside the object can be modulated. For example, the intensity of pixels inside and outside the object location can be modulated in different ways.

Figure 6B:
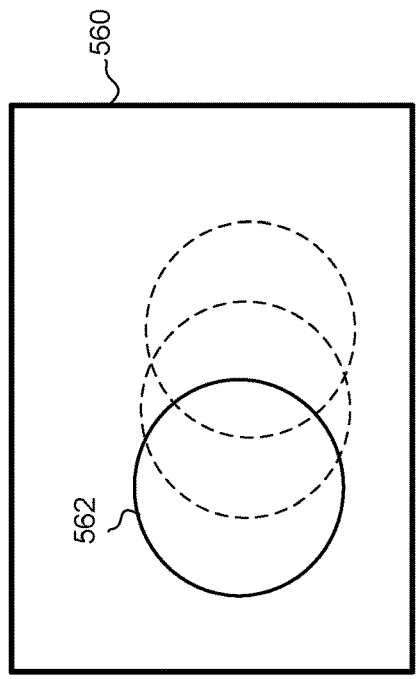
FIGS. 6A and 6B are graphical representations of scanning regions in accordance with various embodiments of the present invention.
Figure 6A:
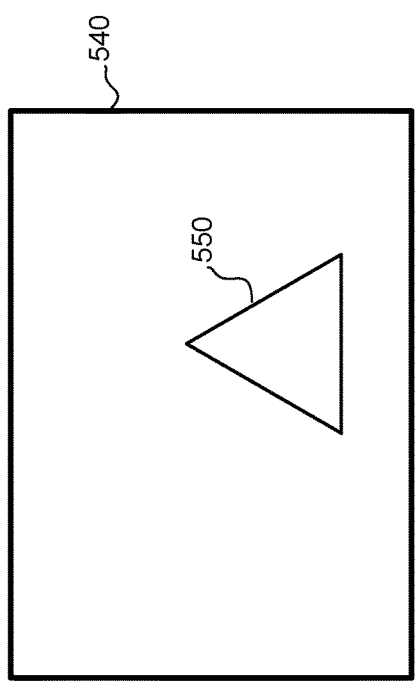

Turning to FIG. 6A, an exemplary scanning region 540 is illustrated. Inside the scanning region is an object 550. The various depth mapping techniques described above can be used to determine a location of the object 550 inside the scanning region 540. With the location of such an object 550 determined the pixels inside and/or outside the object 550 can be modulated. For example, the intensity of pixels one the object 550 can be modulated in a first way, and the intensity of the pixels outside the object 550 can be modulated in a second way, different from the first way. As more specific examples, the image pixels can be modulated by not projecting pixels outside the object 550 location, while continuing the project pixels on the object 550 location.

Such a system can be used to facilitate projection onto a moving object, such as a moving screen or other moving surface on which the image is to be projected. Specifically, in such an embodiment the projection of the pixels outside the object location can be stopped or minimized. In other embodiments the projection of the pixels can be adjusted to match the changes in the objection location or shape. For example, to match changes in a screen based on wind or other factors. Turning to FIG. 6B, an exemplary scanning region 560 is illustrated. Inside the scanning region is an object 562. In this illustrated embodiment the object 562 is moving through the scanning region 560.

In such an application the pixel drive generator can be controlled to turn off or otherwise not project pixels that would not be projected onto the moving object 562, and to instead only project pixels at the current location of the moving object 562. Alternatively, the image pixels can be modulated by not projecting pixels on the object 562 location, while continuing the project pixels outside the object 562 location. Such a system can be used to prevent pixels from being projected on one object 562 while the image continues to be projected around the object 562.

For example, the system can be used to prevent pixels from being projected on a person standing in front of a display screen, where otherwise such projection can be an irritation to the person. In this embodiment multiple 3-dimensional point clouds can be generated and compared to locate a person in the scanning region, and the pixel drive generator 101 can be controlled to reduce the intensity or turn off pixels that would projected onto the person.

Figure 7:
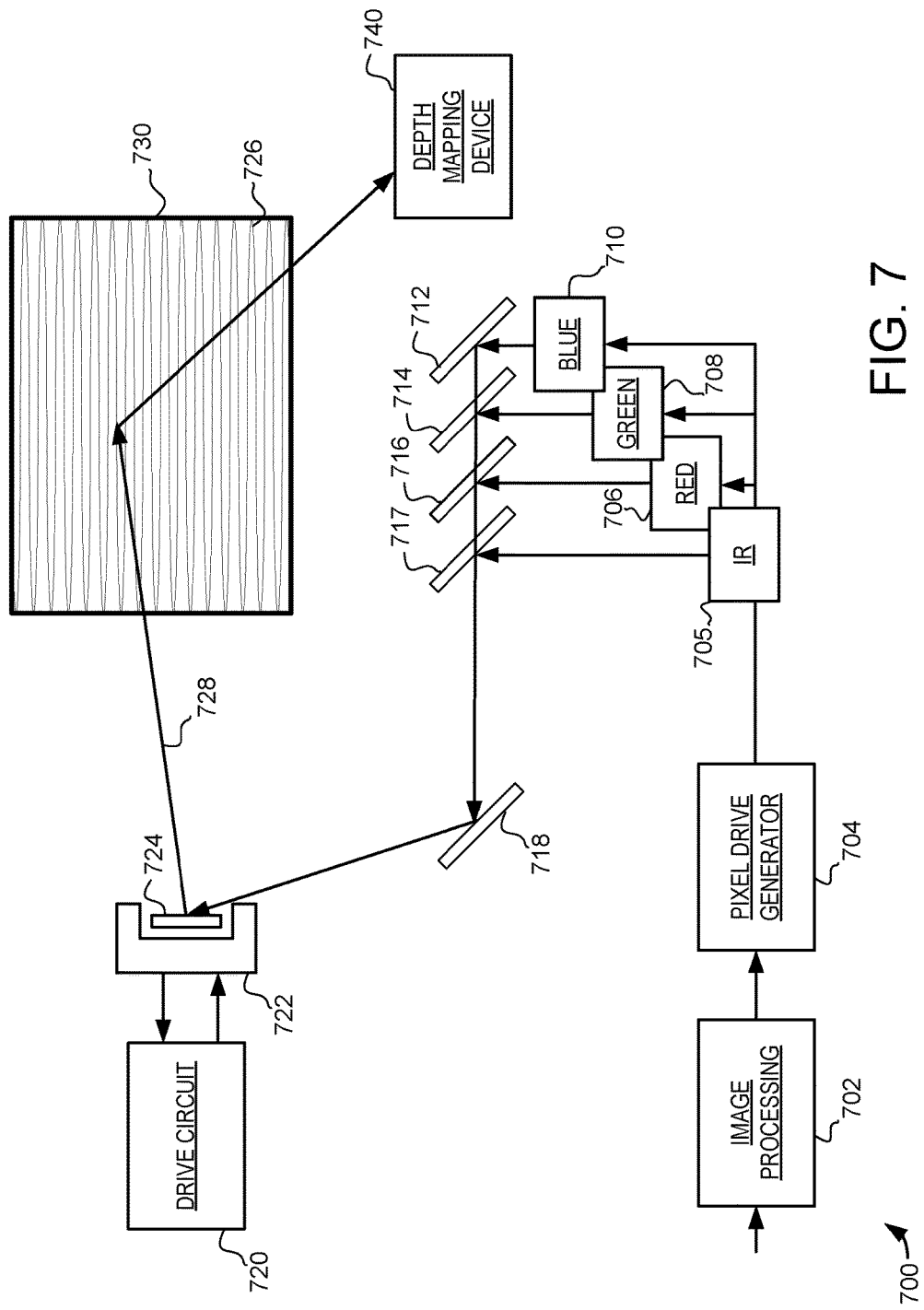
FIGS. 7 shows a schematic view of a scanning laser projector in accordance with various embodiments of the present invention.

Turning now to FIG. 7, a schematic view of a scanning laser projector 700 is illustrated. The scanning laser projector 700 is a more detailed example of the type of system that can be used in accordance with various embodiments of the present invention. Specifically, the scanning laser projector 700 can be implemented to provide both laser depth scanning and laser image projection. Scanning laser projector 700 includes an image processing component 702, a pixel drive generator 704, an infrared laser module 705, a red laser module 706, a green laser module 708, and a blue laser module 710. In such an embodiment the red, green and blue light can be used for image projection, while the infrared light can be used for depth scanning. Light from the laser modules is combined with dichroics 712, 714, 716, and 717. Scanning laser projector 700 also includes fold mirror 718, drive circuit 720, a MEMS device 722 with scanning mirror 724, and a depth mapping device 740. It should be noted that this illustrated arrangement for combing the outputs from the various laser modules is just one example implementation, and other implementations using different techniques for combing laser light of different wavelengths can instead be used.

In operation, image processing component 702 processes video content at using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto an ultra-high speed gimbal mounted 2 dimensional bi-axial laser scanning mirror 724. In some embodiments, this bi-axial scanning mirror is fabricated from silicon using MEMS processes. The vertical axis of rotation is operated quasi-statically and creates a vertical sawtooth raster trajectory. The vertical axis is also referred to as the slow-scan axis. The horizontal axis is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any number of mirrors and type of mirror actuation may be employed without departing from the scope of the present invention.

In some embodiments, the horizontal axis is driven in a resonant mode, and as such is commonly referred to as the fast-scan axis. In some embodiments, raster pattern 726 is formed by combining a sinusoidal component on the horizontal axis and a sawtooth component on the vertical axis. In these embodiments, output beam 728 sweeps back and forth left-to-right in a sinusoidal pattern, and sweeps vertically (top-to-bottom) in a sawtooth pattern with the display blanked during flyback (bottom-to-top).

It should be noted that FIG. 7 illustrates the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern 726.

The drive circuit 720 provides a drive signal to MEMS device 722. The drive signal includes an excitation signal to control the resonant angular motion of scanning mirror 724 on the fast-scan axis, and also includes slow scan drive signal to cause deflection on the slow-scan axis. The resulting mirror deflection on both the fast and slow-scan axes causes output beam 728 to generate a raster scan 726 in an image region 730. In operation, the laser light sources produce light pulses for each output pixel and scanning mirror 724 reflects the light pulses as beam 728 traverses the raster pattern 726. Drive circuit 720 also receives a feedback signal from MEMS device 722. The feedback signal from the MEMS device 722 can describe the maximum deflection angle of the mirror, also referred to herein as the amplitude of the feedback signal. This feedback signal is provided to the drive circuit 720, and is used by the drive circuit 720 to accurately control the motion of the scanning mirror 724.

In operation, drive circuit 720 excites resonant motion of scanning mirror 724 such that the amplitude of the feedback signal is constant. This provides for a constant maximum angular deflection on the fast-scan axis as shown in raster pattern 726. The excitation signal used to excite resonant motion of scanning mirror 724 can include both amplitude and a phase. Drive circuit 720 includes feedback circuit(s) that modifies the excitation signal amplitude to keep the feedback signal amplitude substantially constant. Additionally, the drive circuit 720 can modify the excitation signal to control the horizontal phase alignment and vertical position of the raster pattern 726.

The drive circuit 720 is further configured to dynamically adjust the motion of the scanning mirror 724 during depth scanning to modify the characteristics of the resulting 3-dimensional point cloud of the surface. For example, the drive circuit 720 can be configured to drive the scanning mirror 724 to generate a raster pattern with a first portion for image projection, and a second portion for depth scanning. Additionally, the drive circuit 720 can be configured to provide dynamic adjustment of the horizontal scan rate, horizontal scan amplitude, vertical scan rate, vertical scan amplitude and/or vertical scan waveform shape of the scanning mirror motion. As was described above, this adjustment of the scanning mirror 724 motion modifies the characteristics of the resulting projected image and/or 3-dimensional point clouds.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

Next, it should be noted that while FIG. 7 shows both the laser light for the depth scanning (e.g., light from the infrared laser module 705) and the laser light for image projection (e.g., laser light from the red laser module 706, green laser module 708, and blue laser module 710) all projected into the same region 730, that this is just one example implementation. In other embodiments, the laser light pulses for depth mapping can be directed to one field or region, while the pixels for image projection are directed to another field or region. Such a redirection of pulses or pixels can be accomplished through the use of wavelength dependent optical elements, where these wavelength dependent optical elements are configured to direct light of some component wavelengths to a first region and direct light of other component wavelengths to another region. These wavelength dependent components can include both transmissive and reflective components, including various beam splitters and various combinations thereof. Such a technique would allow for depth mapping to be performed over one region, while an image is being projected into another region.

It should be noted that while FIG. 7 illustrates an embodiment with a single MEMS device 722 and a single scanning mirror 724, that this is just one example implementation. As another example, a scanning laser projector could instead be implemented with scanning mirror assembly that includes two scanning mirrors, with one mirror configured to deflect along one axis and another mirror configured to deflect along a second axis that is largely perpendicular to the first axis.

Such an embodiment could include a second MEMS device, a second scanning mirror, and a second drive circuit. The first scanning mirror could be configured to generate horizontal scanning motion, and the second scanning mirror configured to generate vertical motion. Thus, the motion of one scanning mirror determines the horizontal scan amplitude and the motion of the other scanning mirror determines the vertical scan amplitude.

Finally, although red, green, blue, and infrared laser light sources are shown in FIG. 7, the various embodiments are not limited by the wavelength of light emitted by the laser light sources.

In accordance with the embodiments described herein, the pixel drive generator 704 can be configured to selectively generate projected image pixels during a first portion of the raster pattern of scan lines, and to selectively generate depth mapping pulses during a second portion of the raster pattern of scan lines. Specifically, the pixel drive generator 704 can be configured to drive the red laser module 706, green laser module 708, and blue laser module 710 during a first portion of the raster pattern for image projection. Likewise, the pixel drive generator 704 can be configured to drive the infrared laser module 705 to generate depth mapping pulses during a second portion of the raster pattern for depth mapping.

Also in accordance with the embodiments described herein, the depth mapping device 740 is provided to generate the 3-dimensional point cloud of the surface. To facilitate this, the depth mapping device 740 can include an optical sensor to receive laser light reflected from a surface and generate signals proportional to the received laser light reflections. The depth mapping device 740 can also receive light timing data from the pixel drive generator 704 and/or infrared laser module 705. The depth mapping device can also receive mirror position data from the drive circuit 720. From those signals and data, the depth mapping device 740 generates the 3-dimensional point cloud of the surface. In one embodiment, depth mapping device 740 generates the 3-dimensional point cloud by calculating a time of flight for each pulse that is reflected back and received by the optical sensor. Specifically, the time of flight for each pulse to travel from the infrared laser module 705 to the surface, and back to the optical sensor can be determined at least in part by light timing data and the signals from the optical sensor. The location on the surface corresponding to each pulse can be determined at least in part from the mirror position data. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface.

Figure 8:
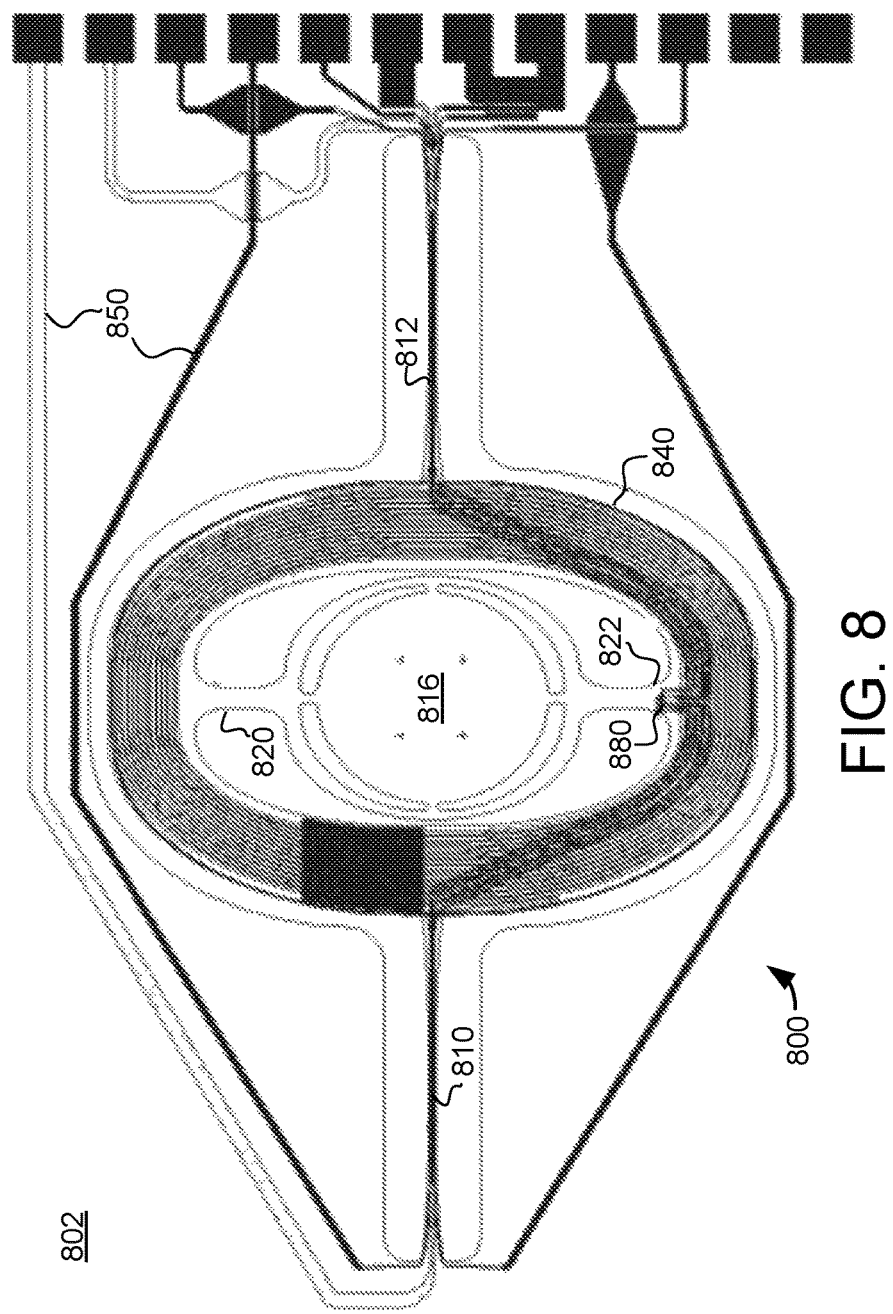
FIG. 8 shows a plan view of a microelectromechanical system (MEMS) device with a scanning mirror in accordance with various embodiments of the present invention.

Turning now to FIG. 8, a plan view of a microelectromechanical system (MEMS) device with a scanning mirror is illustrated. MEMS device 800 includes fixed platform 802, scanning platform 840, and scanning mirror 816. Scanning platform 840 is coupled to fixed platform 802 by flexures 810 and 812, and scanning mirror 816 is coupled to scanning platform 840 by flexures 820 and 822. Scanning platform 840 has a drive coil connected to drive lines 850, which are driven by a drive signal provided from a drive circuit (e.g., drive circuit 720). The drive signal includes an excitation signal to excite resonant motion of scanning mirror 816 on the fast-scan axis, and also includes a slow-scan drive signal to cause non-resonant motion of scanning platform 840 on the slow-scan axis. Current drive into drive lines 850 produces a current in the drive coil. In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 840, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 810 and 812 form a pivot axis. Flexures 810 and 812 are flexible members that undergo a torsional flexure, thereby allowing scanning platform 840 to rotate on the pivot axis and have an angular displacement relative to fixed platform 802. Flexures 810 and 812 are not limited to torsional embodiments as shown in FIG. 8. For example, in some embodiments, flexures 810 and 812 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 816 pivots on a first axis formed by flexures 820 and 822, and pivots on a second axis formed by flexures 810 and 812. The first axis is referred to herein as the horizontal axis or fast-scan axis, and the second axis is referred to herein as the vertical axis or slow-scan axis. In some embodiments, scanning mirror 816 scans at a mechanically resonant frequency on the horizontal axis resulting in a sinusoidal horizontal sweep. Further, in some embodiments, scanning mirror 816 scans vertically at a nonresonant frequency, so the vertical scan frequency can be controlled independently.

In a typical embodiment the MEMS device 800 will also incorporates one or more integrated piezoresistive position sensors. For example, piezoresistive sensor 880 can be configured to produces a voltage that represents the displacement of mirror 816 with respect to scanning platform 840, and this voltage can be provided back to the drive circuit. Furthermore, in some embodiments, positions sensors are provided on one scan axis while in other embodiments position sensors are provided for both axes.

It should be noted that the MEMS device 800 is provided as an example, and the various embodiments of the invention are not limited to this specific implementation. For example, any scanning mirror capable of sweeping in two dimensions to reflect a light beam in a raster pattern or other suitable pattern may be incorporated without departing from the scope of the present invention. Also for example, any combination of static and dynamic/scanning mirrors (e.g., two mirrors: one for each axis) may be utilized to reflect a light beam in a raster pattern. Further, any type of mirror drive mechanism may be utilized without departing from the scope of the present invention. For example, although MEMS device 800 uses a drive coil on a moving platform with a static magnetic field, other embodiments may include a magnet on a moving platform with drive coil on a fixed platform. Further, the mirror drive mechanism may include an electrostatic drive mechanism.

The scanning laser projectors described above (e.g., scanning laser projector 100 of FIG. 1 and scanning laser projector 700 of FIG. 7) can be implemented in a wide variety of devices and for a wide variety of applications. Several specific examples of these types of devices will not be discussed with reference to FIGS. 8-13. In each case, the various embodiments described above can be implemented with or as part of such a device.

Figure 9:
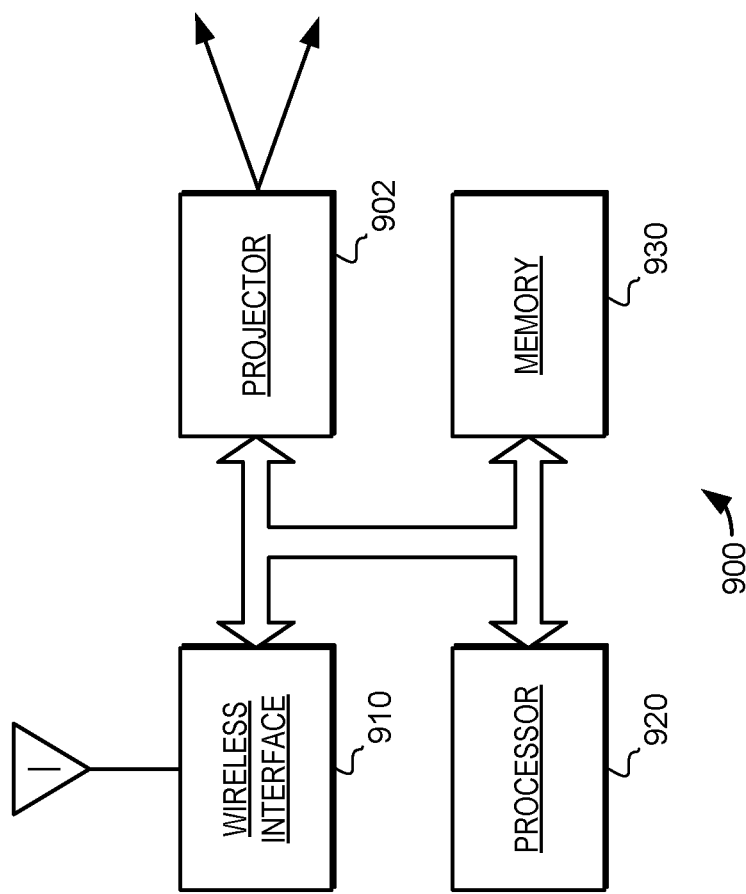
FIG. 9 shows a block diagram of a mobile device in accordance with various embodiments of the present invention.

Turning to FIG. 9, a block diagram of a mobile device 900 in accordance with various embodiments is illustrated. Specifically, mobile device 900 is an example of the type of device in which a scanning laser projector can be implemented. As shown in FIG. 9, mobile device 900 includes wireless interface 910, processor 920, memory 930, and laser projector 902.

Laser projector 902 may receive image data from any image source. For example, in some embodiments, laser projector 902 includes memory that holds still images. In other embodiments, laser projector 902 includes memory that includes video images. In still further embodiments, scanning laser projector 902 displays imagery received from external sources such as connectors, wireless interface 910, a wired interface, or the like.

Wireless interface 910 may include any wireless transmission and/or reception capabilities. For example, in some embodiments, wireless interface 910 includes a network interface card (NIC) capable of communicating over a wireless network. Also for example, in some embodiments, wireless interface 910 may include cellular telephone capabilities. In still further embodiments, wireless interface 910 may include a global positioning system (GPS) receiver. One skilled in the art will understand that wireless interface 910 may include any type of wireless communications capability without departing from the scope of the present invention.

Processor 920 may be any type of processor capable of communicating with the various components in mobile device 900. For example, processor 920 may be an embedded processor available from application specific integrated circuit (ASIC) vendors, or may be a commercially available microprocessor. In some embodiments, processor 920 provides image or video data to scanning laser projector 902. The image or video data may be retrieved from wireless interface 910 or may be derived from data retrieved from wireless interface 910. For example, through processor 920, scanning laser projector 902 may display images or video received directly from wireless interface 910. Also for example, processor 920 may provide overlays to add to images and/or video received from wireless interface 910, or may alter stored imagery based on data received from wireless interface 910 (e.g., modifying a map display in GPS embodiments in which wireless interface 910 provides location coordinates).

Figure 10:
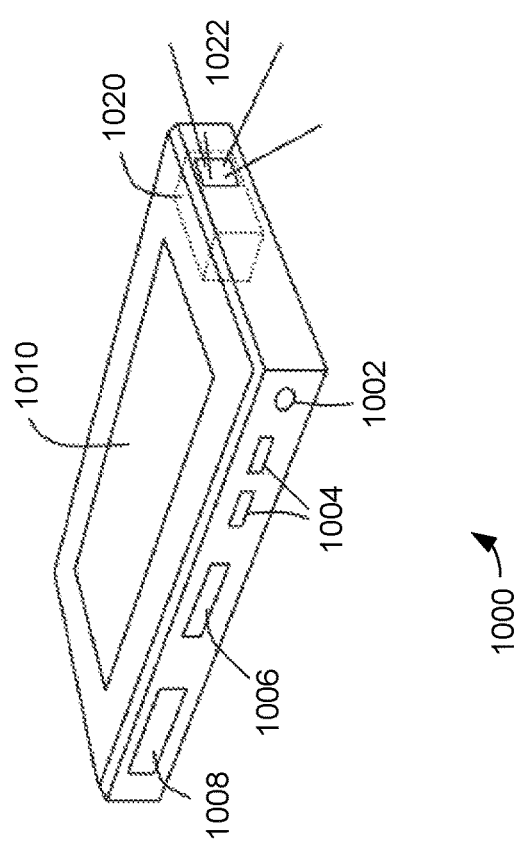
FIG. 10 shows a perspective view of a mobile device in accordance with various embodiments of the present invention.

Turning to FIG. 10, a perspective view of a mobile device 1000 in accordance with various embodiments is illustrated. Specifically, mobile device 1000 is an example of the type of device in which a scanning laser projector can be implemented. Mobile device 1000 may be a hand held scanning laser projector with or without communications ability. For example, in some embodiments, mobile device 1000 may be a laser projector with little or no other capabilities. Also for example, in some embodiments, mobile device 1000 may be a device usable for communications, including for example, a cellular phone, a smart phone, a tablet computing device, a global positioning system (GPS) receiver, or the like. Further, mobile device 1000 may be connected to a larger network via a wireless (e.g., cellular), or this device can accept and/or transmit data messages or video content via an unregulated spectrum (e.g., WiFi) connection.

Mobile device 1000 includes laser projector 1020, touch sensitive display 1010, audio port 1002, control buttons 1004, card slot 1006, and audio/video (A/V) port 1008. Again, the laser projector 1020 can implement a combination scanning laser projector with laser depth scanning. In some embodiments the mobile device may only include only the laser projector 1020 without any of touch sensitive display 1010, audio port 1002, control buttons 1004, card slot 1006, or A/V port 1008. Some embodiments include a subset of these elements. For example, an accessory projector may include scanning laser projector 1020, control buttons 1004 and A/V port 1008. A smartphone embodiment may combine touch sensitive display device 1010 and projector 1020.

Touch sensitive display 1010 may be any type of display. For example, in some embodiments, touch sensitive display 1010 includes a liquid crystal display (LCD) screen. In some embodiments, display 1010 is not touch sensitive. Display 1010 may or may not always display the image projected by laser projector 1020. For example, an accessory product may always display the projected image on display 1010, whereas a mobile phone embodiment may project a video while displaying different content on display 1010. Some embodiments may include a keypad in addition to touch sensitive display 1010. A/V port 1008 accepts and/or transmits video and/or audio signals. For example, A/V port 1008 may be a digital port, such as a high definition multimedia interface (HDMI) interface that accepts a cable suitable to carry digital audio and video data. Further, A/V port 1008 may include RCA jacks to accept or transmit composite inputs. Still further, A/V port 1008 may include a VGA connector to accept or transmit analog video signals.

In some embodiments, mobile device 1000 may be tethered to an external signal source through A/V port 1008, and mobile device 1000 may project content accepted through A/V port 1008. In other embodiments, mobile device 1000 may be an originator of content, and A/V port 1008 is used to transmit content to a different device.

Audio port 1002 provides audio signals. For example, in some embodiments, mobile device 1000 is a media recorder that can record and play audio and video. In these embodiments, the video may be projected by laser projector 1020 and the audio may be output at audio port 1002.

Mobile device 1000 also includes card slot 1006. In some embodiments, a memory card inserted in card slot 1006 may provide a source for audio to be output at audio port 1002 and/or video data to be projected by scanning laser projector 1020. Card slot 1006 may receive any type of solid state memory device, including for example secure digital (SD) memory cards.

Figure 11:
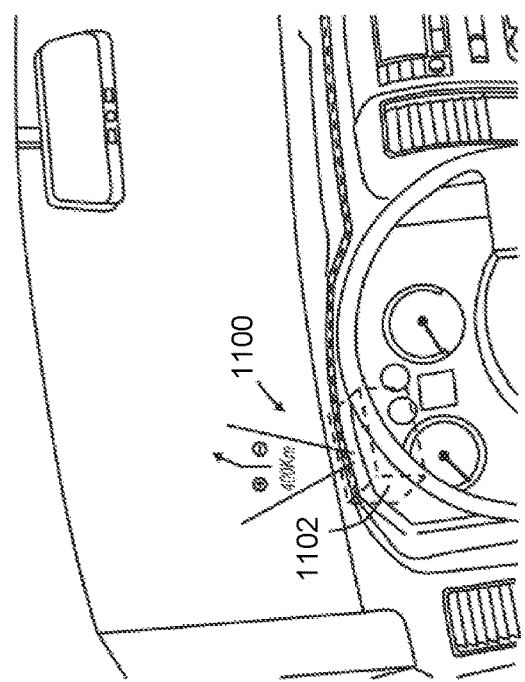
FIG. 11 shows a perspective view of a head-up display system in accordance with various embodiments of the present invention.

Turning to FIG. 11, a perspective view of a head-up display system 1100 in accordance with various embodiments is illustrated. Specifically, head-up display system 1100 is an example of the type of device in which a scanning laser projector as described above can be implemented. The head-up display system 1100 includes a laser projector 1102. The laser projector 1102 can again implemented as a scanning laser projector. The laser projector 1102 is shown mounted in a vehicle dash to project the head-up display. Although an automotive head-up display is shown in FIG. 11, this is not a limitation and other applications are possible. For example, various embodiments include head-up displays in avionics application, air traffic control applications, and other applications.

Figure 12:
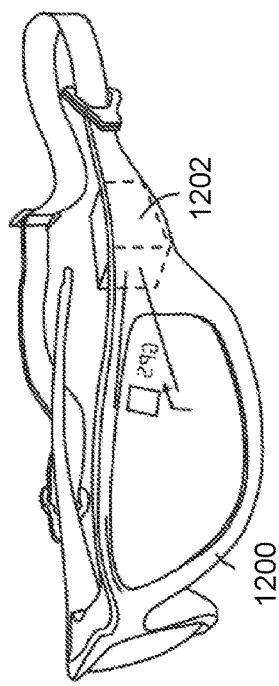
FIG. 12 shows a perspective view of eyewear in accordance with various embodiments of the present invention.

Turning to FIG. 12, a perspective view of eyewear 1200 in accordance with various embodiments is illustrated. Specifically, eyewear 1200 is an example of the type of device in which a scanning laser projector as described above can be implemented. Eyewear 1200 includes scanning laser projector 1202 to project a display in the eyewear's field of view. In some embodiments, eyewear 1200 is see-through and in other embodiments, eyewear 1200 is opaque. For example, eyewear 1200 may be used in an augmented reality application in which a wearer can see the display from projector 1202 overlaid on the physical world. Also for example, eyewear 1200 may be used in a virtual reality application, in which a wearer's entire view is generated by projector 1202.

Although only one projector 1202 is shown in FIG. 12, this is not a limitation and other implementations are possible. For example, in some embodiments, eyewear 1200 includes two projectors 1202, with one for each eye.

Figure 13:
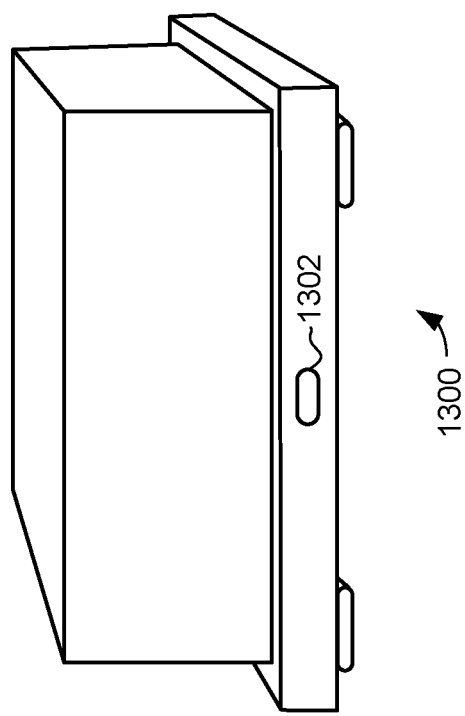
FIG. 13 shows a perspective view of a robotic apparatus in accordance with various embodiments of the present invention.

Turning to FIG. 13, a perspective view of a robotic apparatus 1300 in accordance with various embodiments is illustrated. The robotic apparatus 1300 is exemplary of the type of devices that can be implemented with a scanning laser projector 1302. Again, as described above, the scanning laser projector 1302 can be implemented to provide both image projection and depth mapping capabilities.

In the illustrated example, the robotic apparatus 1300 is a self-guiding mobile robot that can perform a variety of functions. For example, the robotic apparatus 1300 can be implemented to provide cleaning services, delivery services, media services, gaming, or otherwise act as entertainment device. In each case the depth mapping provided by the scanning laser projector 1302 can be used to provide a variety of functions, including navigation, interactivity, object recognition, etc.

As one example, the depth mapping provided by the scanning laser projector 1302 can be used to guide the robotic apparatus 1300 during cleaning or other navigation. As another example, the depth mapping provided by the scanning laser projector 1302 can be used to locate and identify objects. As another example, the image projection and depth mapping provided by the scanning laser projector 1302 can be used to provide a user interface with the robotic apparatus 1300, for example, by projecting images and allowing a user to control the apparatus with gestures that interact with those images. As another example, the robotic apparatus 1300 can use the scanning laser projector 1302 to display visual media to user, such as by identifying the location of a surface using the depth mapping and then projecting images on that located surface. Finally, it should be noted that these various embodiments could also apply to animatronic robotic devices that emulate human, animal or other such life-like characteristics.

It should be noted that to facilitate this robotic apparatus 1300 could include a variety of other features. For example, in addition to the scanning laser projector 1302, other sensor devices can be included to contribute to navigation. Furthermore, other human interfaces can be provided to facilitate interactions and control of the robotic device 1300. As other examples, the robotic apparatus 1300 may also include audio output devices and other such communication devices.

Figure 14:
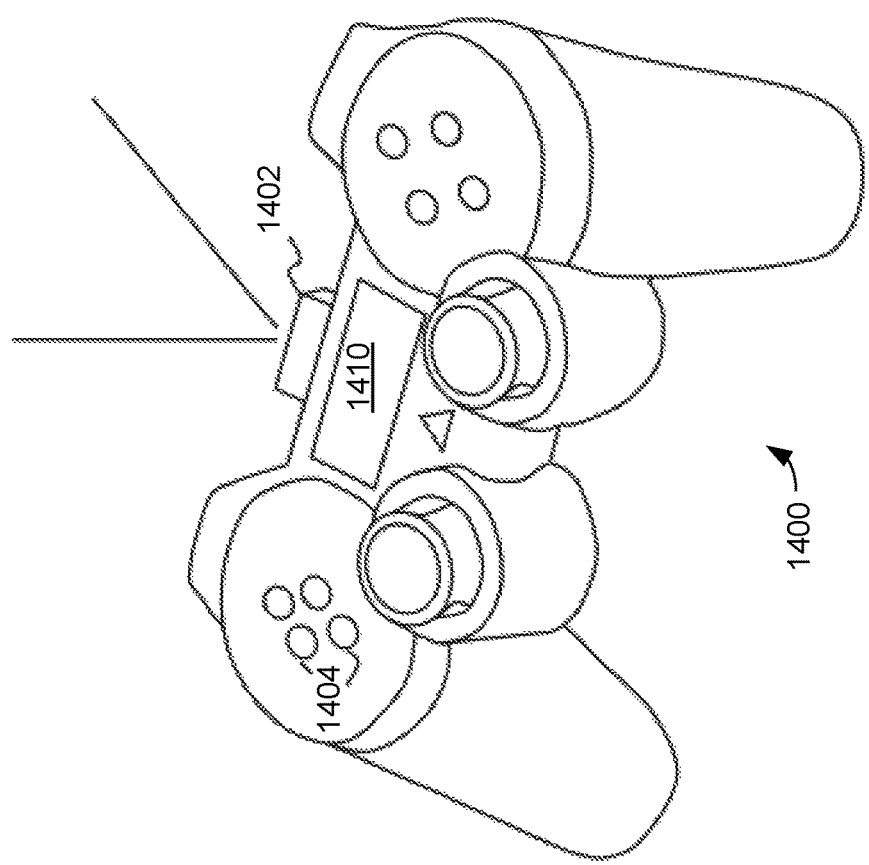
FIG. 14 shows a perspective view of a gaming apparatus in accordance with various embodiments of the present invention.

Turning to FIG. 14, a perspective view of a gaming apparatus 1400 in accordance with various embodiments is illustrated. Again, gaming apparatus 1400 can be implemented with a scanning laser projector. Gaming apparatus 1400 includes buttons 1404, display 1410, and projector 1402. In some embodiments, gaming apparatus 1400 is a standalone apparatus that does not need a larger console for a user to play a game. For example, a user may play a game while watching display 1410 and/or the projected content. In other embodiments, gaming apparatus 1400 operates as a controller for a larger gaming console. In these embodiments, a user may watch a larger screen tethered to the console in combination with watching display 1410 and/or projected content.

In one embodiment, a scanning laser projector is provided, the scanning laser projector comprising: at least one source of laser light, the at least one source of laser light configured to generate a laser beam; at least one scanning mirror configured to reflect the laser beam; a drive circuit configured to provide an excitation signal to excite motion of the at least one scanning mirror to reflect the laser beam in a pattern of scan lines; a pixel drive generator, the pixel drive generator configured to control the at least one source of laser light to selectively generate projected image pixels with the laser beam and selectively generate depth mapping pulses with the laser beam, and wherein the pixel drive generator is configured to generate projected image pixels during a first portion of the pattern of scan lines and generate depth mapping pulses during a second portion of the pattern of scan lines; and a depth mapping device configured to receive reflections of the depth mapping pulses and generate a 3-dimensional point clouds based at least in part on timing of the received reflections of the depth mapping pulses, and wherein the pixel drive generator is configured to modulate intensity of selected projected image pixels in response to the 3-dimensional point clouds.

In another embodiment, a scanning laser projector is provided, the scanning laser projector comprising: at least one source of laser light, the at least one source of laser light configured to generate a laser beam; at least one scanning mirror configured to reflect the laser beam; a drive circuit configured to provide an excitation signal to excite motion of the at least one scanning mirror to reflect the laser beam in a pattern of scan lines; a pixel drive generator, the pixel drive generator configured to control the at least one source of laser light to selectively generate projected image pixels with the laser beam and selectively generate depth mapping pulses with the laser beam, and wherein the pixel drive generator is configured to generate projected image pixels during a first portion of the pattern of scan lines and generate depth mapping pulses during a second portion of the pattern of scan lines and a third portion of the pattern of scan lines; and a depth mapping device configured to receive reflections of the depth mapping pulses during the second portion of the pattern of scan lines and the third portion of the pattern of scan lines, and further configured to generate 3-dimensional point clouds based at least in part on timing of the received reflections of the depth mapping pulses by using data from reflections during the second portion of the pattern of scan lines and the third portion of the pattern of scan lines, and wherein the pixel drive generator is configured to modulate intensity of selected projected image pixels in response to the 3-dimensional point clouds.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector, comprising:
at least one source of laser light, the at least one source of laser light configured to generate a laser beam;
at least one scanning mirror configured to reflect the laser beam;
a drive circuit configured to provide an excitation signal to excite motion of the at least one scanning mirror to reflect the laser beam in a pattern of scan lines;
a pixel drive generator, the pixel drive generator configured to control the at least one source of laser light to selectively generate projected image pixels with the laser beam and selectively generate depth mapping pulses with the laser beam, and wherein the pixel drive generator is configured to generate projected image pixels during a first portion of the pattern of scan lines and generate depth mapping pulses during a second portion of the pattern of scan lines; and
a depth mapping device configured to receive reflections of the depth mapping pulses and generate a 3-dimensional point cloud based at least in part on timing of the received reflections of the depth mapping pulses, and wherein the pixel drive generator is configured to modulate intensity of selected projected image pixels in response to the 3-dimensional point clouds.

2. The scanning laser projector of claim 1, wherein the first portion of the pattern of scan lines comprises scan lines during an active display period and wherein the second portion of the pattern of scan lines comprises scan lines during a vertical retrace period.

3. The scanning laser projector of claim 1, wherein the pixel drive generator is configured to modulate intensity of selected projected image pixels by reducing the intensity of the selected projected image pixels.

4. The scanning laser projector of claim 1, wherein the depth mapping device is configured to generate a first 3-dimensional point cloud and then generate a second 3-dimensional point cloud, and wherein the depth mapping device is configured to compare the second 3-dimensional point cloud to the first 3-dimensional point cloud.

5. The scanning laser projector of claim 4, wherein the depth mapping device is configured to compare the second 3-dimensional point cloud to the first 3-dimensional point cloud to determine an object location in a field of the projected image pixels.

6. The scanning laser projector of claim 5, wherein the pixel drive generator is configured to modulate intensity of selected projected image pixels in response to the 3-dimensional point clouds by modulating pixels outside the object location in a first way and modulating pixels inside the object location in a second way different from the first way.

7. The scanning laser projector of claim 5, wherein the pixel drive generator is configured to modulate intensity of selected projected image pixels in response to the 3-dimensional point clouds by not projecting pixels on the object location while continuing to project pixels outside the object location.

8. The scanning laser projector of claim 5, wherein the pixel drive generator is configured to modulate intensity of selected projected image pixels in response to the 3-dimensional point clouds by not projecting pixels outside the object location while continuing to project pixels on the object.

9. The scanning laser projector of claim 1, wherein the first portion of the pattern of scan lines comprises scan lines during an active display period and wherein the second portion of the pattern of scan lines comprises scan lines during a vertical retrace period, and wherein the pixel drive generator is configured to modulate intensity of the selected projected image pixels in an active display immediately following the vertical retrace period during which changes in the 3-dimensional point clouds are detected.

10. The scanning laser projector of claim 1, wherein the depth mapping device is configured to generate 3-dimensional point clouds based at least in part on timing of the received reflections of the depth mapping pulses by determining a relatively coarse mapping based on received reflections during a vertical retrace period and determining a relatively detailed mapping based on received reflections during an active display period.

11. The scanning laser projector of claim 1, wherein the depth mapping device is configured to generate 3-dimensional point clouds based at least in part on timing of the received reflections of the depth mapping pulses by determining a region of interest based on received reflections during a vertical retrace period and determining a detailed mapping of the region of interest during an active display period.

12. The scanning laser projector of claim 1, wherein the first portion of the pattern of scan lines comprises scan lines moving in a first direction and wherein the second portion of the pattern of scan lines comprises scan lines moving in a second direction, where the first direction and the second direction are opposite directions.

13. The scanning laser projector of claim 1, wherein the first portion of the pattern of scan lines and the second portion of the pattern of scan lines are horizontal scan lines interlaced together.

14. The scanning laser projector of claim 1, wherein the first portion of the pattern of scan lines comprises scan lines during an active display period and wherein the second portion of the pattern of scan lines comprises scan lines during a vertical retrace period.

15. The scanning laser projector of claim 1, wherein the first portion of the pattern of scan lines and the second portion of the pattern of scan lines comprises generating projected image pixels and depth mapping pulses in each scan line.

16. The scanning laser projector of claim 1, wherein the mapping device generates the 3-dimensional point cloud by calculating a time of flight for a return of the depth mapping pulses in the laser beam.

17. The scanning laser projector of claim 1, wherein the motion of the at least one scanning mirror has a horizontal scan rate, a horizontal scan amplitude, a vertical scan rate, and a vertical scan amplitude, and wherein the drive circuit is further configured to dynamically adjust at least one of the horizontal scan rate, the horizontal scan amplitude, the vertical scan rate, and the vertical scan amplitude to modify characteristics of the 3-dimensional point cloud.

18. The scanning laser projector of claim 17, wherein the drive circuit is configured to dynamically decrease the vertical scan rate of the at least one scanning mirror to provide increased horizontal resolution in the 3-dimensional point cloud.

19. The scanning laser projector of claim 1, wherein the at least one source of laser light comprises an infrared laser, and wherein a pixel drive generator is configured to generate the depth mapping pulses with the infrared laser.

20. The scanning laser projector of claim 19, wherein the at least one source of laser light additionally comprises a red laser, a blue laser, and a green laser and wherein a pixel drive generator is configured to generate projected image pixels using the red laser, the blue laser, and the green laser.

21. A scanning laser projector, comprising:
at least one source of laser light, the at least one source of laser light configured to generate a laser beam;
at least one scanning mirror configured to reflect the laser beam;
a drive circuit configured to provide an excitation signal to excite motion of the at least one scanning mirror to reflect the laser beam in a pattern of scan lines;
a pixel drive generator, the pixel drive generator configured to control the at least one source of laser light to selectively generate projected image pixels with the laser beam and selectively generate depth mapping pulses with the laser beam, and wherein the pixel drive generator is configured to generate projected image pixels during a first portion of the pattern of scan lines and generate depth mapping pulses during a second portion of the pattern of scan lines and a third portion of the pattern of scan lines; and
a depth mapping device configured to receive reflections of the depth mapping pulses during the second portion of the pattern of scan lines and the third portion of the pattern of scan lines, and further configured to generate 3-dimensional point clouds based at least in part on timing of the received reflections of the depth mapping pulses by using data from reflections during the second portion of the pattern of scan lines and the third portion of the pattern of scan lines, and wherein the pixel drive generator is configured to modulate intensity of selected projected image pixels in response to the 3-dimensional point clouds.

22. The scanning laser projector of claim 21, wherein the first portion of the pattern of scan lines comprises scan lines during an active display period, and wherein the second portion of the pattern of scan lines comprises scan lines during a vertical retrace period, and wherein the third portion of the pattern of scan lines comprises scan lines during the active display period.

23. The scanning laser projector of claim 22, wherein the depth mapping device is configured to generate 3-dimensional point clouds based at least in part on timing of the received reflections of the depth mapping pulses by determining a relatively coarse mapping based on received reflections from the second portion of the pattern of scan lines and determining relatively detailed mapping based on received reflections from the third portion of the pattern of scan lines.

24. The scanning laser projector of claim 22, wherein the depth mapping device is configured to generate 3-dimensional point clouds based at least in part on timing of the received reflections of the depth mapping pulses by determining a region of interest based on received reflections from the second portion of the pattern of scan lines and determining detailed mapping of the region of interest from the third portion of the pattern of scan lines.

25. The scanning laser projector of claim 21, wherein the first portion of the pattern of scan lines comprises scan lines moving in a first direction during an active display period and wherein the third portion of the pattern of scan lines comprises scan lines moving in a second direction during the active display period, where the first direction and the second direction are opposite directions.

* * * * *